US005597441A

United States Patent [19]

Volk

[11] Patent Number: 5,597,441

[45] Date of Patent: Jan. 28, 1997

[54] PORTABLE HAND-HELD LABELLING AND MARKING DEVICE AND PRINTING MECHANISM HOUSING THEREFOR

[75] Inventor: Heinrich Volk, Beerfelden, Germany

[73] Assignee: Esselte Meto International GmbH, Heppenheim, Germany

[21] Appl. No.: 402,128

[22] Filed: Mar. 10, 1995

[30] Foreign Application Priority Data

Mar. 12, 1994 [DE] Germany .......................... 44 08 462.5

[51] Int. Cl.[6] ....................................... B32B 31/00

[52] U.S. Cl. ......................... 156/579; 156/523; 156/384; 156/577

[58] Field of Search .................................. 156/523, 277, 156/384, 542, 574, 577, 579

[56] References Cited

U.S. PATENT DOCUMENTS 4,954,208 9/1990 Hamisch, Jr. et al. ............ 156/579 X

FOREIGN PATENT DOCUMENTS 2357373 2/1978 France .
2450029 4/1975 Germany .
2512471 9/1976 Germany .
3143393 5/1983 Germany .
3635333 5/1988 Germany .
3738186 5/1989 Germany .

*Primary Examiner*—James Engel
*Attorney, Agent, or Firm*—Nils H.Ljungman and Associates

[57] ABSTRACT

A hand-held labelling or marking device can typically have a housing With a printing mechanism that provides a printed ink image, such as prices, etc. Such a housing can be formed by two housing parts. At least at one point, in particular on the upper portion of the housing, the housing parts can be securely held together by means of a clamp-type holder, thereby minimizing the size of the housing. The clamp-type holder can preferably include a window for displaying a row of symbols that will be printed, which symbols can be disposed on either a belt, or a wheel of a wheel printing mechanism. Each belt or wheel can be set individually by means of a control shaft. Adjacent the window, there can preferably be special symbols corresponding to the print belts or wheels, and on a control shaft for setting of the individual belts or wheels there can be corresponding symbols to make the setting process faster and easier process. A control wheel and a control lever of an advancing mechanism for serially advancing the settings of the belts or wheels can also advantageously be accessible by means of the window.

18 Claims, 8 Drawing Sheets

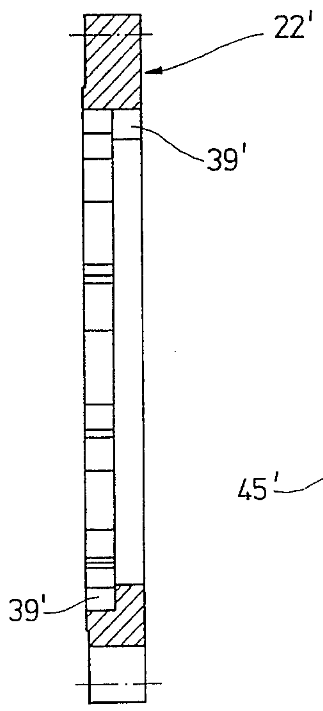
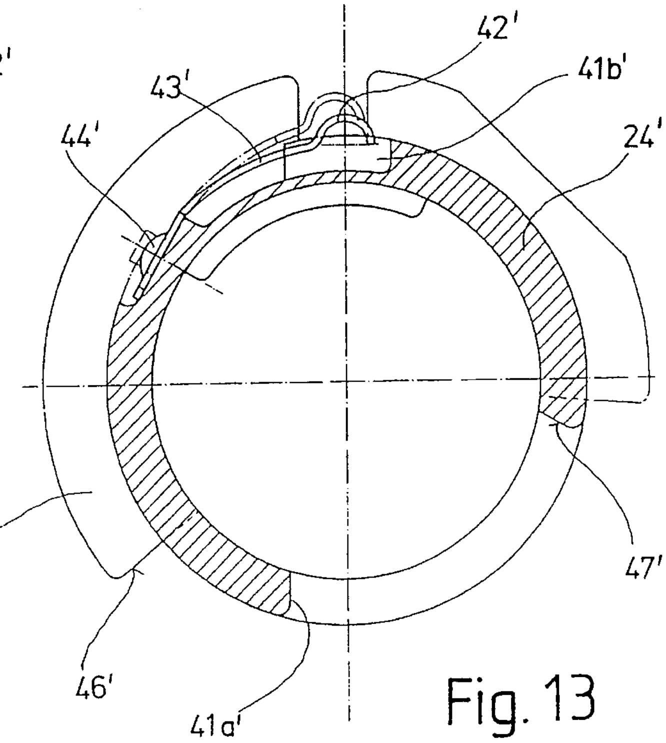
Fig. 13
Fig. 12
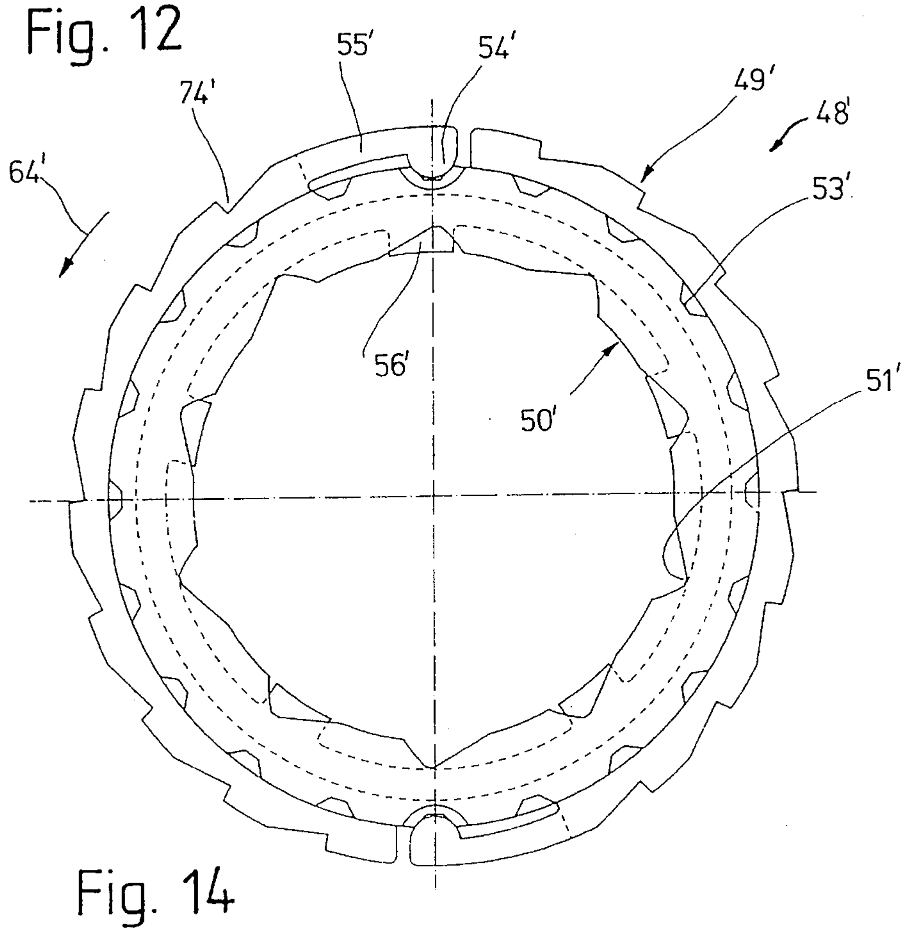
Fig. 14

PORTABLE HAND-HELD LABELLING AND MARKING DEVICE AND PRINTING MECHANISM HOUSING THEREFOR

BACKGROUND OF THE INVENTION

1. Field of the Invention

The present invention generally relates to hand-held labelling and marking devices for printing information such as prices, etc. on a label material, or alternately, directly onto an article. Such devices are currently used in most stores, but especially large numbers of such units are used in supermarkets. Such devices for labelling and marking will typically have a printing mechanism with a number of print wheels or printing belts for carrying the print-type. In the case where print wheels are used, the print wheels can preferably Be coaxially mounted in the printing mechanism, whereas, when belts are used, the belts are guided around multiple, coaxial sets of guide wheels within the printing mechanism. These guide wheels can include printing area-side guide wheels for positioning the print-type that is to be printed, and oppositely spaced adjustable guide wheels for rotatably positioning the belts to a desired print-type at a printing location about the printing-area side guide wheels.

More specifically, the present invention relates to a printing mechanism, preferably for a hand-held labelling unit, and the housing of the printing mechanism. In general, the housing surrounds and holds the belts or wheel printing mechanisms and also an axially movable control shaft for adjusting individual ones of the belt strips or wheels. The housing can preferably be formed by two housing parts, which housing parts can be divided along a plane which is parallel to the plane of a belt or wheel.

2. Background Information

The units as described above are typically used to mark retail merchandise, by applying a marking directly onto the individual products or packages, or by marking an adhesive label and then applying the adhesive label to the packages or products, to indicate at least the selling price. Because the prices are different from product to product, the printing mechanism must of course be adjustable, at least to some extent, if the printing mechanism is to be used universally. One possibility for adjustment of such a printing mechanism is to equip the unit with an axially movable control shaft. Such a control shaft can preferably be extracted in steps, to make it possible to individually adjust each of the individual belts or wheel printing mechanisms.

But there are also applications in which objects must be labelled with serial numbers. Consequently, such a printing mechanism should also be able, if necessary, to print not always the same group of symbols, but other symbols or groups of symbols, instead of or in addition to the original symbols, e.g. numbers in an ascending series. This requirement that it be possible to individually set known printing mechanisms for serial numbering, etc., requires that the printing mechanism be equipped with an advancing mechanism that advances the print-type at least one printing unit for every label or marking produced.

In a labelling unit, in particular a hand-held labelling unit of the type described above, a number of labels can be located on a feeder roll, and the labels can be printed in sequence by means of the printing mechanism. A corresponding dispenser, incorporated into the labelling unit can deliver the printed labels to the products or to their packaging. The labels are transported through this labelling unit by means of a corresponding stepper mechanism, and at the appropriate time, the printing mechanism can be moved toward the label to print the label. Various printing processes can be used, but essentially, this process is comparable to stamping a document. For reasons of weight alone, efforts can generally be made to keep units or the components of such units as small and lightweight as possible. In addition, so that a hand-held labelling unit is still easy to pick up and operate, attention must of course also be paid to small size and light weight. On a belt or wheel printing mechanism, for example, there can be a limit to the size or number of symbols which dan be located on each wheel. The general objective, however, is to reduce the size and weight of the unit end of its components.

On one type of known wheel printing mechanism, the housing consists of a base part, which base part contains practically the entire mechanism, and a cover. The cover is by and large flat, and closes the base part. Both parts of the housing must be detachably connected to one another for purposes of assembly, and also for repair. For this known printing mechanism, this detachable connection is made by means of screws, the geometric axes of which extend parallel to the axes of the wheel printing mechanism. Each screw requires a threaded hole, and on this known unit, this requirement for providing a threaded hole typically results in a significant increase in the size of the housing, in relation to the size which would be required only to hold the wheels themselves.

OBJECT OF THE INVENTION

The object of the present invention is consequently to improve a printing mechanism of the type described above so that the size of the housing of the printing mechanism can be reduced or optimized in relation to the known models.

SUMMARY OF THE INVENTION

The present invention teaches that this object can be accomplished if the two parts of the housing are held together by means of at least one clamp-type holder which engages each of the housing parts and thereby holds the parts together. Such a holder can preferably overlap, or cover, all of the belts or wheels, and in addition can preferably extend to overlap the two housing walls which are parallel to the plane of the belts or wheels.

This printing mechanism can also have a two-part housing, as such a housing can be convenient for assembly and repair of the interior components of the mechanism. As such, both of the housing parts must of course be able to be held together in some appropriate manner. It has been determined that the size of the housing can be significantly reduced if the housing, or the interior thereof, closely borders the belt or wheel printing mechanism with minimal clearance therebetween, and if the need to attach special lugs or bosses, or similar elements for threaded fastening holes, can be eliminated. With the elimination of the lugs or bosses radially outwardly of the belts or wheels, the housing size can essentially be minimized to essentially border the belts or wheels over at least a substantial portion of the diameter of the printing wheels, or belts and guide wheels, in the upper part of the housing.

In accordance with the present invention, the two parts of the housing can be held together by means of a clamp-type holder, at least at one location on the housing. Such a clamp-type holder can result in a reduction of the size of the housing. The clamp-type holder can preferably form a part of the housing itself, and thus, the housing would essentially not require any special lugs or similar elements for threaded fasteners or for the insertion of connecting screws. While it might be desirable that more than one such clamp-type element be used, in some housings, there can be parts of the printing mechanisms at which the insertion of a connecting screw essentially might not cause any interference or increases in overall size. Such a screw could even be used to perform two functions, i.e., to hold the housing together and serve as the axle of a wheel, etc., so that the use of the screw does not represent a disadvantage. The insertion of at least one such screw is also possible on the printing mechanism claimed by the present invention.

The clamp-type holder can be clamped to both parts of the housing, and can thus hold the housing parts together at the point in question. As will be discussed further herebelow with reference to the embodiments of the present invention, such a fastening essentially results in no unnecessary increase in the size of the housing in the vicinity of the clamp-type holder. To provide such a clamping action, the clamp-type holder can preferably have at least two spaced apart legs, with each leg engaging at least a part of each housing half to thereby keep the housing halves from moving away from one another.

In one refinement of the invention, the plane of separation of the housing parts can preferably be located approximately in the middle of the housing. This makes it possible to use two housing halves which are of at least approximately equal size. If any additional requirements must be taken into consideration, the housing can also be constructed of two identically sized housing halves, which can, for the most part, be mirror images of one another along the plane of separation.

In an additional configuration of the present invention, in at least one embodiment of the housing, the clamp-type holder can preferably be located in an area of the housing which is approximately opposite to the working area of the belts or wheels. In other words, the clamp-type holder can be located opposite to the area of the housing at which the belts or wheels perform the printing. If the working area of the belts or wheels is designated as the lower area of the housing, which might typically be the orientation of the printing mechanism in the labelling device, that means that the clamp-type holder can preferably be located in the upper portion of the printing mechanism. In general, with such an orientation as described above, the lower area of the housing of the printing mechanism preferably fits into a portion of the labelling device, with the upper portion of the housing extending out of the labelling device.

Because a two-piece housing may not be securely held together by means of a single holder, in the case described above, there might also be measures in the lower portion of the housing for an additional connection of the two halves of the housing. As indicated above, while the additional connection could be formed by means of an additional clamp-type holder, the additional connection device need not be made by means of a clamp-type holder.

The present invention teaches that this additional connection can be accomplished in a particularly preferred manner if the two housing parts are held together in the vicinity of the working area by means of a screw or similar element. Such a screw, or similar element, could specifically extend with its entire length at right angles through the housing, with its geometric axis running parallel to the axis of the wheels or pulleys of the belts of the printing mechanism. Especially in a belt printing mechanism, there is generally sufficient space for at least one such connecting screw in the lower portion when the mechanism is oriented as described above. This area can generally fall between the belt guide wheels, and within the loop formed by the belts.

In an additional embodiment of the present invention, the assembly of the housing can be made significantly easier if the two parts, or halves of the housing are oriented in relation to one another by means of centering edges or similar elements. As such, one of the parts of the housing can preferably have an edge stepped outwardly, which edge preferably overlaps a recessed, or inwardly stepped, edge of the other part of the housing, so that the housing can be smooth, or flush along the seam between the two parts. It is also conceivable to have a tongue-and-groove connection of the two halves or parts of the housing.

As noted above, the holder can preferably be attached to the housing, or to both parts of the housing by clamping. The connection can essentially be made more secure if the housing and the holder are also preferably snapped or locked together, i.e., if a non-positive connection is replaced by a positive connection, or if there is an additional positive connection.

Special refinements in this regard, in particular the configuration of the middle piece of the holder as a frame, are disclosed further herebelow in the following description of the embodiments.

In one embodiment, it can be preferable that the clamp-type holder be provided with a window for viewing the setting of the belts or print wheels. It can thereby be particularly advantageous that a complete row of symbols be visible through the window in the frame, so that the setting can at least be checked through the window, and so that changes can even be made to the settings if necessary. Alternatively, depending on the orientation of the holder, etc., the window could be provided in the housing parts at a location different from the location of the clamping holder.

The individual wheels of a wheel printing mechanism or the belts of a belt printing mechanism can preferably be rotated relative to one another. In this manner, it can essentially become possible to arrange virtually any arbitrary positioning of all of the symbols and all the wheels or belts. A prerequisite for this capability is that it must essentially be possible to turn each wheel or each belt of the group of wheels of belts individually. In known devices, this capability is achieved by means of an axially movable control shaft as mentioned above. The control shaft can be pulled outward, for example, starting from its fully inserted position, so that its engagement mechanism will correspond to each of the wheels or belts in sequence. By rotating the control shaft, each wheel of the wheel printing mechanism, or each belt of the belt printing mechanism, can be rotated by the required amount.

When the shaft is extracted, the correspondence with the individual belts or wheels should also preferably be made visible in a suitable manner. Such a visible correspondence can essentially make it reliably possible to turn the wheel or belt in question, and thereby avoid inadvertent or incorrect settings of all the other wheels and belts, the positions of which are to be retained. In one known generic printing mechanism, this visual display of the correspondence is accomplished in a complex manner by means of a control element which is rigidly coupled to the control shaft and has a pointer which, apart from the expense of the material and assembly required for the pointer, takes up a great deal of space. In one particularly preferred embodiment of the present invention, adjacent the wheels or belts, along the edge of the window, there can preferably be markings, i.e.

dots, lines, or numbers. The control shaft can then preferably be provided with matching markings, essentially in reverse order from the window markings so that as the shaft is withdrawn, the visible marking on the shaft corresponds to the appropriate window marking and corresponding wheel or belt which would be turned. This offers a particularly elegant solution which requires no additional parts and thus no additional effort or expense for assembly.

In an additional configuration of the present invention, with regard to the holder, there can preferably be a group of belts, or wheels of the belt or wheel printing mechanism, and, next to one of the outer belts or wheels in the axial direction, there can preferably be a control wheel of an advancing mechanism. Such a control wheel can preferably be accessible by means of the window and a corresponding rotating control lever that projects out of the window. The control lever can preferably be configured to engage and disengage the control wheel with the advancing mechanism. This configuration can essentially make it possible, in a particularly simple manner, to control the steps which are used to advance the wheels or belts of the printing mechanism in question forward by one unit.

The embodiments of the present invention will be discussed in more detail hereinbelow with reference to the accompanying drawings. It should be understood that when the word "invention" is used in this application, the word "invention" includes "inventions", that is, the plural of "invention". By stating "invention", Applicant does not in any way admit that the present application does not include more then one patentably and non-obviously distinct invention, and maintains the possibility that this application may include more then one patentably and non-obviously distinct invention. The Applicant hereby asserts that the disclosure of this application may include more then one invention, and, in the event that there is more than one invention, that these inventions may be patentable and non-obvious, one with respect to the other.

One aspect of the invention resides broadly in a hand-held, portable labelling device for printing a print-type image on a label, the labelling device comprising: a first housing; handle apparatus for gripping the labelling device in a hand; printing apparatus removably disposed within the first housing for printing on a label to produce a printed label, the printing apparatus being movable in a direction towards and away from the label; apparatus for actuating the printing apparatus to move the printing apparatus towards and away from the label; apparatus for providing ink to the printing apparatus; apparatus for supplying labels; apparatus for feeding labels from the label supply apparatus to the printing apparatus; the printing apparatus comprising: a second housing, the second housing comprising a first housing portion and a second housing portion, the first housing portion and the second housing portion together defining an interior space therebetween, the first housing portion defining a housing wall, end the second housing portion defining a housing well, the housing wall of the first end second housing portions being disposed substantially parallel to one another; print-type disposed in the interior space of the second housing for printing on the label; apparatus for selectively positioning the print-type for printing on the label; and apparatus, being disposed about at least a part of the housing well of each of the first and second housing portions, for holding together the first and second housing portions at least about the holding apparatus; and the holding apparatus comprising e substantially U-shaped clamping member, the substantially U-shaped clamping member comprising: a base portion with first and second legs extending from the base portion; the first leg comprising apparatus for releasably engaging the at least a part of the housing wall of the first housing portion; the second leg comprising apparatus for releasably engaging the at least a part of the housing wall of the second housing portion; end the base portion comprising apparatus for positioning the first and second legs of the holding apparatus with respect to one another for pressing together the first and second housing portions.

Another aspect of the invention resides broadly in a hand-held, portable printing device for printing a print-type image, the printing device comprising: a first housing; handle apparatus for gripping the printing device in a hand; printing apparatus removably disposed within the first housing for printing on a surface to produce a printed print-type image, the printing apparatus being movable in a direction towards and away from the surface; apparatus for actuating the printing apparatus to move the printing apparatus towards and away from the surface; apparatus for providing ink to the printing apparatus; the printing apparatus comprising: a second housing, the second housing comprising a first housing portion and a second housing portion, the first housing portion and the second housing portion together defining an interior space therebetween; print-type disposed in the interior space of the housing for printing on the surface; apparatus for selectively positioning the print-type for printing on the surface; and apparatus, being disposed about at least a part of each of the first and second housing portions, for holding together the first and second housing portions at least about the holding apparatus; and the holding apparatus comprising: a first portion for releasably engaging the at least a part of the first housing portion; a second portion for releasably engaging the at least a part of the second housing portion; and apparatus for positioning the first and second portions of the holding apparatus with respect to one another for pressing together the first and second housing portions.

A still further aspect of the invention resides broadly in a method for assembling a hand-held, portable labelling device for printing e print-type image on a label, the labelling device comprising: a first housing; handle apparatus for gripping the labelling device in a hand; printing apparatus removably disposed within the first housing for printing on a label to produce a printed label, the printing apparatus being movable in a direction towards and away from the label; apparatus for actuating the printing apparatus to move the printing apparatus towards and away from the label; apparatus for providing ink to the printing apparatus; apparatus for supplying labels; apparatus for feeding labels from the label supply apparatus to the printing apparatus; the printing apparatus comprising: a second housing, the second housing comprising a first housing portion and a second housing portion, the first housing portion and the second housing portion together defining en interior space therebetween; print-type disposed in the interior space of the second housing for printing on the surface; apparatus for selectively positioning the print-type for printing on the surface; and apparatus, being disposed about at least a part of each of the first and second housing portions, for holding together the first and second housing portions at least about the holding apparatus; the holding apparatus comprising: a first portion for releasebly engaging the at least a part of the first housing portion; a second portion for releasably engaging the at least a part of the second housing portion; and apparatus for positioning the first and second portions of the holding apparatus with respect to one another for pressing together the first and second housing portions, the method comprising the steps of: providing the first housing; providing the handle apparatus on the first housing for gripping the labelling device in a hand; providing the printing apparatus; removably disposing at least a portion of the printing apparatus within the first housing; providing the apparatus for actuating the printing apparatus to move the printing apparatus towards and away from the label; providing the apparatus for providing ink to the printing apparatus; providing the apparatus for supplying labels; providing the apparatus for feeding labels from the label supply apparatus to the printing apparatus; the providing of the printing apparatus comprising the steps of: providing the first housing portion and the second housing portion; providing the print-type within at least one of the first housing portion and the second housing portion; providing the apparatus for selectively positioning the print-type within the at least one of the first housing portion and the second housing portion; providing the holding apparatus for being disposed about at least a part of each of the first and second housing portions; disposing the holding apparatus about the at least a part of each of the first and second housing portions, the disposing comprising: releasably engaging the first portion of the holding apparatus with the at least a part of the first housing portion; releasably engaging the second portion of the holding apparatus with the at least a part of the second housing portion; and pressing and maintaining together the first and second housing portions with the apparatus for positioning the first and second portions of the holding apparatus.

BRIEF DESCRIPTION OF THE DRAWINGS

The embodiments of the present invention are described below with reference to the accompanying figures, in which:

FIG. 12 shows a longitudinal center section through an indexing gear of the stepping device;

FIG. 13 shows a cross section through the hollow shaft solidly connected to the housing, with an orientation device for all the gear wheels which are farther from the printing area;

FIG. 14 shows a view of a stepping device of the control device for the number of steps to be moved.

DESCRIPTION OF THE PREFERRED EMBODIMENTS

Figure 1:
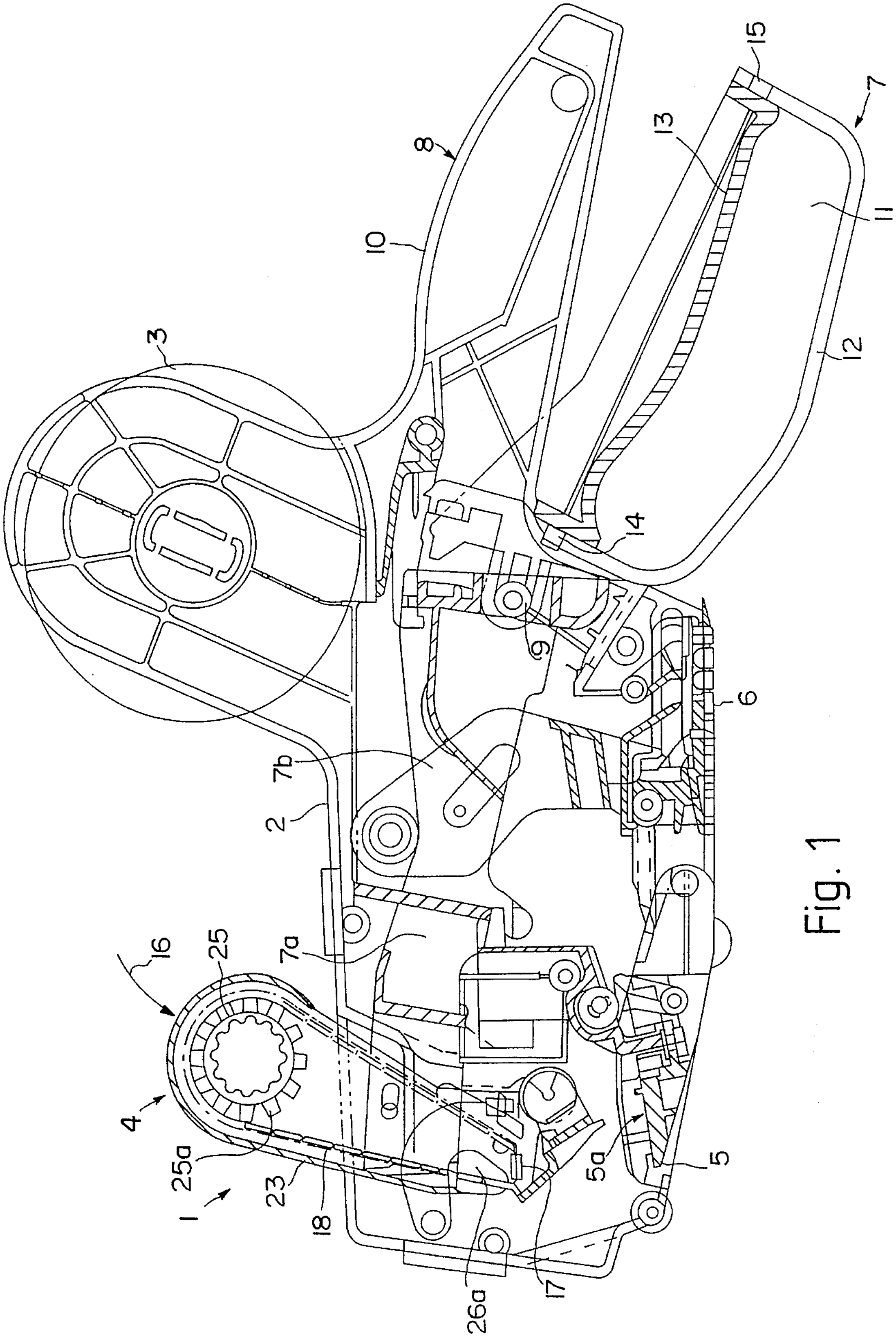
FIG. 1 shows a side view, in partial section, of a hand-held labelling unit with a belt printing mechanism.

For printing labels or similar media which are supplied on a carrier or backing strip, or alternatively, printing directly onto an item, a device such as a hand-held labelling unit 1, as shown in FIG. 1, can be used. Such a device can typically have a printing mechanism 4 for providing the printing, which printing mechanism 4 can either be configured to print directly onto an article, or onto a label. For a labelling unit, the carrier or backing strip with the labels disposed thereon can essentially be provided by a label feed roll 3. With the orientation as shown in FIG. 1, the label feed roll 3 can preferably be located in an upper portion of a housing 2. After the labels are fed through the unit 1 and printed as necessary, the printed labels can be applied to products or product packages in a known manner, such as by means of a dispensing edge 5.

Since labels frequently have to indicate more than just a price, it can generally be necessary to print other symbols as well, such as letters of the alphabet. A mechanism for providing a serial numbering, or step-wise incrementing of the print-type will be discussed further herebelow with reference to FIGS. 6–15. The required print type for printing the price, etc. can essentially be provided in the printing mechanism 4, in the form of wheels having the print-type disposed thereabout, or belts 18 which carry print-type 17 about guide wheels, as will be discussed further herebelow. The carrier strip with the labels, or similar media, can essentially be transported through the unit 1 in a known manner. The strip with the labels is transported until it arrives underneath the printing mechanism 4 (illustrated in more detail in FIG. 2), at a printing area 5_a_ where the label can be printed. From the area 5_a_, a printed label can be transported to the dispensing edge 5, where the label can be detached from the backing strip.

A known transport device 6 can be provided in the labelling unit 1 to transport the labels through the labelling unit 1. The printing mechanism 4 and the transport device 6 can preferably be advanced in a known manner by means of a hand lever 7.

FIG. 1 shows an initial or idle position of the hand lever 7, which position is assumed by the hand lever 7 under the action of a built-in spring (not shown). When the hand lever is pivoted around a bearing 9, i.e. counterclockwise or toward a hand grip 8 (described further below), the printing mechanism 4 can preferably be moved in a printing direction 16 by means of a handle portion 7_a_, and the transport device 6 can preferably be driven by a lever 7_b_ that is actuated along with the handle portion 7_a_. For activation, the fingers of the operating hand can be extended into an opening 11 of the hand lever 7. The hand itself, i.e., at least a portion of a palm, can preferably be supported on an upper side 10 of the hand grip 8. This hand grip 8 can preferably be solidly attached to the unit 1, or can be molded with the unit 1 as one integral piece. In the depicted embodiment, the opening 11 can be formed by a handle shell 12 of the hand lever 7, and a handle part 13 mounted so that it can pivot in bearings 14, 15. This floating mounting (support) of the handle part 13 on the hand lever 7 can essentially be particularly advantageous for long work with the hand-held labelling unit 1, while also providing protection for the hand.

Figure 2:
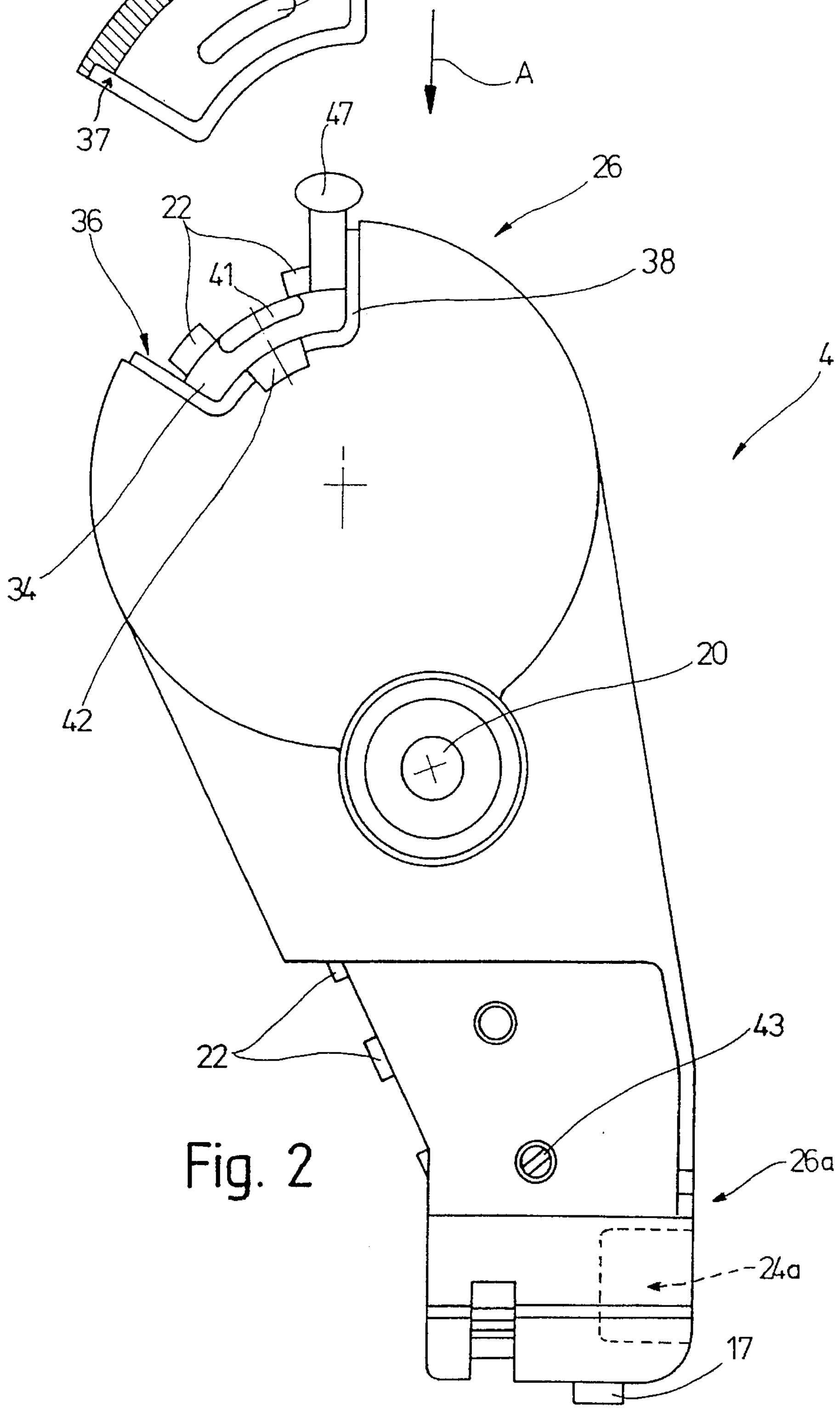
FIG. 2 shows a side view of the belt printing mechanism on an enlarged scale.

When the hand lever 7 is pulled up toward the hand grip 8, the printing mechanism 4 is pivoted in the direction indicated by the arrow 16, whereupon lower print symbols 17, located in the work position immediately above the print area 5*a*, can be pressed onto the label, and the impression of these symbols can thus be made on the corresponding label (see also FIG. 2 for more details regarding the printing mechanism 4).

Figure 4:
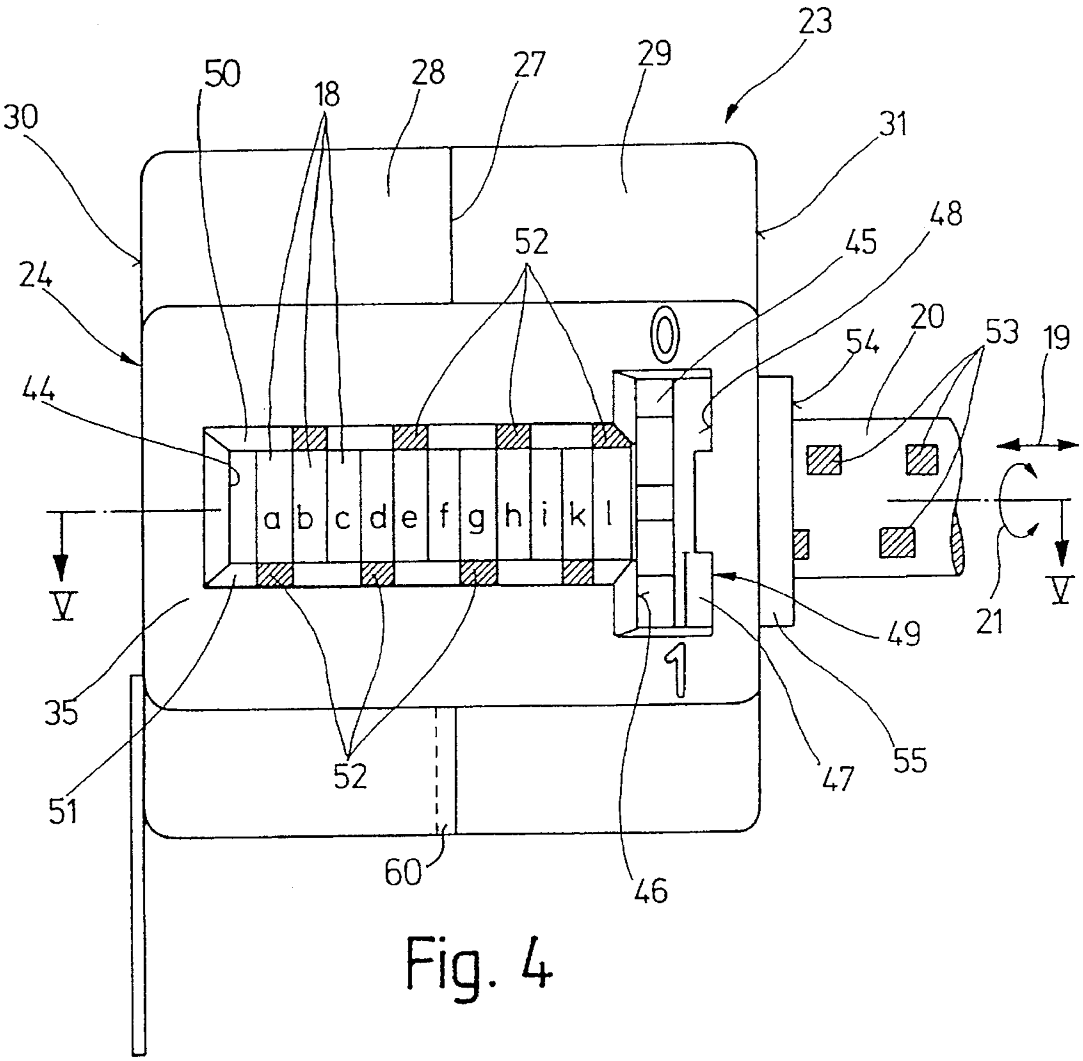
FIG. 4 shows a view of the belt printing mechanism in the direction indicated by the arrow A in FIG. 2.

As shown in FIGS. 1 and 2, at essentially equal intervals on the outside circumference of each belt 18, of the belt printing mechanism 4, there can preferably be symbols 17, 22, e.g. the letters shown in FIG. 4, or numbers and any other symbols, including small groups of symbols. The belts 18 can preferably be advanced in steps, by means of an advancing mechanism such as the type described further herebelow, unless the advancing mechanism has been deactivated. With an advancing mechanism, for example, it is possible to serially number the products being labelled. Alternatively, the setting of each belt 18 with respect to its neighboring belts can be achieved by means of a control shaft 20. Such a control shaft 20 can preferably be pulled out, or pushed in in steps, in a direction indicated by double arrow 19 shown in FIG. 4, whereby each step can preferably correspond to the width of one belt 18. On the shaft 20, more particularly, on the end thereof disposed within the printing mechanism 4, which end is not shown, there can preferably be an external toothing (not shown) for engaging external teeth 25*a* (see FIG. 1) of upper wheels 25. In each extraction position, wherein the teeth of the shaft 20 are engaged with the teeth 25*a* of the wheels 25, the control shaft 20 can be rotated in a direction indicated by the double arrow 21 shown in FIG. 4, or possibly in only one direction of rotation, to rotate the correspondingly coupled belt 18 clockwise or counterclockwise, thereby controlling the character or symbol to be printed. Instead of a belt printing mechanism 4, a wheel printing mechanism can also be used, in which wheel printing mechanism the symbols 17, 22 would not be located on the outside of a belt 18, but instead on the circumference of a wheel.

The basic objective is to design such units 1 so that the units 1 are as small as possible, to thereby make the units 1 easier to handle. Consequently, essentially every component of the hand-held labelling unit 1 has been closely examined to determine whether each component can be made more compact.

Figure 3:
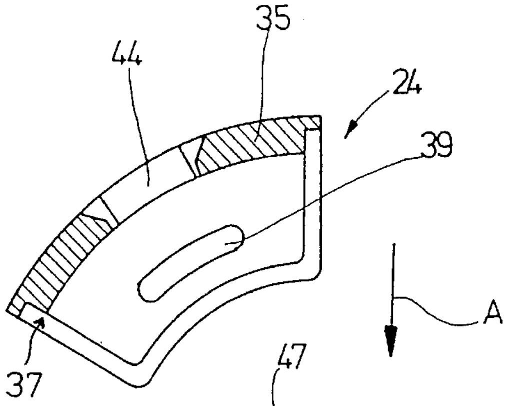
FIG. 3 shows, in a vertical section taken along line III—III of FIG. 5, the clamp-type holder used to hold the two parts of the housing together.
Figure 5:
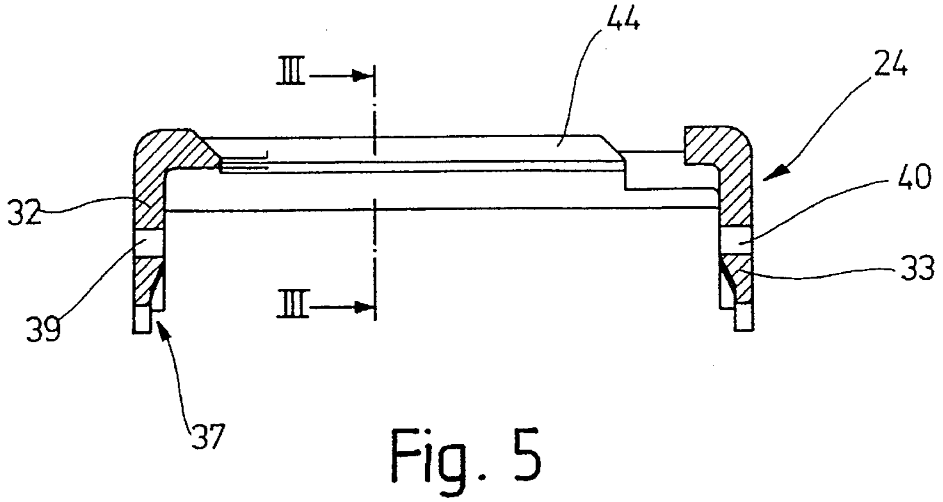
FIG. 5 shows a cross section along Line V—V in FIG. 4.

The present invention teaches that the housing 23 of the printing mechanism 4 can be further improved regarding the size thereof. On a known labelling unit, there is a housing which consists of a base part and a flat cover. The plane of separation between the two parts runs parallel to the plane of the belts or wheels. The two parts of the housing should preferably be securely held together in an appropriate manner. The present invention teaches that the housing parts can be held together by means of at least one clamp-type holder 24 as shown in FIGS. 3–5. Consequently, as shown in FIGS 1 and 2, the housing 23 can closely surround the upper pulley wheels 25 for the belts 18, because the holder 24 makes it unnecessary to attach fastening lugs or similar housing elements for the installation of fastening screws, radially external to the pulley wheels 25. The same construction could also be provided for a wheel printing mechanism, in which the printing wheels can then also be correspondingly closely enclosed by the housing 23.

In the illustrated embodiment, there can be sufficient space in the lower portion of the housing 23 of the printing mechanism 4 for a fastening screw 43 and the corresponding lugs or similar measures which must be attached to the housing. It can therefore be sufficient, in at least the depicted embodiment, that there be only one holder 24, while a second holder 24*a* (shown only in outline in FIG. 2, as an example of one possible location thereof) could also be provided to replace the screw 43. For the depicted housing 23, the holder 24 is preferably located in a portion 26 which is uppermost on the housing 23, that is, when the unit has the orientation as shown in the embodiment illustrated in FIG. 2. For purposes of simplicity, the holder 24 is not shown in FIG. 1.

A plane of separation 27 of the housing 23, as shown in FIG. 4, at least in the illustrated embodiment, can preferably be in the middle of the housing, so that two identical, or at least approximately identical, housing parts 28 end 29 can be provided in essence, it can be understood, that the housing parts 28 and 29 have essentially a mirror-image symmetry. Each housing part 28, 29 preferably has a planar outer wall 30, 31, which preferably are disposed substantially parallel to one another. As shown in FIG. 5, the holder 24 can preferably have two parallel clips 32 and 33, by means of which the holder 24 can overlap the parallel housing walls 30, 31 of the upper portion 26 of the housing 23.

In their upper portion 26, the two housing parts 28 and 29 preferably form a housing passage 36 (see FIG. 2) which can be essentially rectangular in projection, or U-shaped in terms of the housing walls. The holder 24 can preferably be inserted into this passage 36. So that the clips 32 and 33 of the holder 24 can be flush on the outside of the housing 23 with the housing walls 30 and 31, the well thickness of the parallel parts of the walls 30 and 31 can preferably be reduced in the vicinity of where the holder 24 fits thereinto. Thus, in a direction towards the passage 36, the walls 30 and 31 can have a step-shaped edge 38 to reduce the thickness thereof, which step-shaped edge 38 can be stepped towards the interior of the housing 23. This reduction in thickness could preferably be about one-half of the thickness of the walls 30, 31. A middle piece 35 of the essentially U-shaped clamp-type holder 24 can similarly also have a step-shaped edge 37 to reduce the thickness thereof, which step-shaped edge 37 essentially complements the edge 38 so that when joined together, an essentially smooth outer surface of the housing 23 can be obtained.

As shown in FIG. 3, the middle piece 35 of the holder 24 can preferably be rounded in a hollow fashion and can preferably have the same radius as the housing 23 in its upper portion 26. The holder 24 can then be inserted into the passage 36, in particular so that holder 24 is flush on the outside with the housing 23, and essentially provides a continuation thereof in terms of the curvature of the housing 23. Along essentially the entire outer contour, the wall thickness of the clamp-type holder 24 can preferably be reduced in steps on the inside thereof to provide the encircling step 37, additionally shown in FIG. 5 in another view of the holder 24.

The step 38 on the housing 23 in the vicinity of its housing passage 36 can preferably correspond to the step 37. The result can preferably be a tight and flush seating of the holder 24 against the housing 23.

To secure the holder 24 to the housing 23, in the vicinity of the clips 32, 33, there can preferably be snap closures. In the illustrated embodiments of FIGS. 2, 3 and 5, the snap closure is essentially formed by slot-shaped snap-in locators 39 and 40 respectively, and a snap-in element 41 of an appropriate shape on each housing part 28 and 29, respectively. FIG. 2 shows the snap-in element 41.

Both the housing 23 and the holder 24 can preferably be made of plastic so that the flexible locking of the holder 24 to the housing 23 should essentially not be a problem. Additionally, other solid materials such as metal could be used as well, but would undoubtedly be more expensive to manufacture, and would also undoubtedly add additional weight to the unit 1. To release the lock between the snap-in elements 41 and the slot-shaped locators 39, 40, there can preferably be a separation bevel 42 on at least one side of the housing 23. This bevel 42 can preferably be configured so that a screwdriver, or other similar type of tool, can be inserted between the holder 24 and the housing 23 so that the corresponding clips 32, 33 can be raised far enough away from the housing 23 to release the lock at that point. The removal of the rest of the holder 24 can then be a relatively simple task.

The two housing parts 28 and 29 can preferably be oriented in relation to one another, along the plane of separation 27, in a manner which is not illustrated in any great detail, and which is generally known. This orientation could essentially be done by means of centering edges 60 (shown only by dashed lines in FIG. 4) similar to the step-shaped edges 37 and 38 as discussed above.

FIG. 2 also shows the connecting screw 43, by means of which the two housing parts 28 and 29 can be firmly held together in the lower portion 26*a* of the housing 23. In general, within the loop of the belt 18, there dan be an empty space in this lower portion 26*a* of the housing, see for example the depiction in FIG. 1, in which space, a screw 43 would not require the housing 23 to be enlarged.

The middle piece 35 of the holder 24, as shown clearly in FIG. 4, can preferably form a frame with a window 44. In the window 44, essentially only a single complete row of symbols can preferably be visible. The window 44 and belts 18 can preferably be configured such that the symbols shown in the window 44 essentially represent the print-type 17 which will be applied during a printing operation. The symbols 17, as well as the symbols 22, essentially project radially away from the plane of the belt 18. To advance each belt 18, there can preferably be an advancing mechanism, i.e., control shaft 20 as discussed above, by means of which the belts 18 can be moved forward in steps. Depending on the configuration of the belts 18 and the spacing of the symbols 22, to advance a belt 18 from one projecting symbol 22 to the next one, two or more steps may be necessary.

An incrementing setting of the belts 18 can be accomplished by means of a control wheel 45, wherein operation of such a control wheel 45 will be discussed below with reference to FIGS. 6–15. In a particularly advantageous embodiment of the present invention, this control wheel 45 can preferably be easily accessible from outside, and essentially does not require the operator to open the housing 24 to activate or deactivate the control wheel 45. For this purpose, the window 44 can preferably be provided with a portion 46 which is widened in the circumferential direction, for example, on the right hand side in FIG. 4. A control lever 47, which is discussed in more detail below with reference to FIG. 15 (part 61'), can also be provided to pass through this widened window portion 46. The control lever 47 can preferably be mounted so that it can pivot in a known manner between two pivot limit positions, which limit positions are designated "0" and "1" in FIG. 4. In the "0" position, the advancing mechanism (not shown, but by means of which the belts 18 for the serial numbering can be advanced by one or more steps in a known manner), can preferably be deactivated, while in the "1" position, the control lever 47 can cause to re-engage the advancing mechanism with the control wheel 45. This arrangement, as well as the control wheel 45, are generally known and are therefore not described in any greater detail herein.

Since the control lever 47 passes through the opening 46, the control lever 47 can essentially be easily accessible from the outside. To provide a means for retaining the control lever 47 in place, on both ends of the widened portion 46 of the window 44, as shown in FIG. 4, there can preferably be snap-in locators 48 and 49 respectively, for the limit positions of the control lever 47. To switch the control lever 47, starting from the depicted position of the control lever 47, the control lever 47 can be first pushed toward the left out of locator 49, then pivoted upwardly adjacent locator 48. If the lever 47 is released in the pivot limit position, the lever 47 can preferably automatically enter the other snap-in locator 48, on account of the elasticity of the material of which the lever 47 can preferably be made. This automatic entering of the lever 47 into the locator 48 can essentially also apply to the locator 49. The snap-in locators can thereby protect against unintentional displacement of the lever 47 from its desired operating position.

The use of a clamp-type holder 24 to hold the two housing parts 28 end 29 securely together can essentially result in a very advantageous refinement of the printing mechanism 1, which refinement essentially makes it much easer to adjust the belts, etc. within the housing 23, and the design of which is significantly simpler than known designs. As shown in FIG. 4, there can preferably be markings 52 on at least one of the longitudinal edges 50 and 51 of the window 44, while the depicted embodiment shows such markings 52 on both edges 50 and 51. Alternatively, and as not shown in FIG. 4, each belt 18 of the belt printing mechanism, or the corresponding wheel of a wheel printing mechanism could have a marking 52.

Along with the markings 52, there can preferably be corresponding markings 53 on the control shaft 20. The markings 53 can preferably be oriented so that in each defined position into which the control shaft 20 can be moved, there can be a specific corresponding marking 53 aligned with an indexing mark or similar indexing device. The indexing mark, for example, could preferably be a terminal edge 54 of a bearing block 55 for the control shaft 20, for example. When a marking 53 has completely gone beyond this terminal end 43, then the belt 18, for which there is a corresponding identical marking 52, could preferably be coupled to the control shaft 20 so that the operator would readily be able to determine the belt 18 which would be turned.

In the depicted embodiment, an arrangement of essentially three markings 52 is provided, wherein for belts depicting symbols "a", "d", "g" and "k" there is a mark 52 on edge 51 of the window 44; for belts depicting symbols "b", "e", "h" and "l" there is a mark 52 on edge 50; and for belts depicting symbols "c", "f" and "i", no marking 52 is provided on either edge 50 or 51. Thus, in a leftmost, or first, position of the shaft 20, a lower mark 53 would be displayed adjacent the terminal edge 54 corresponding to the belt 18 depicting the symbol "a". In the next rightward, or second position of the shaft 20, corresponding to the belt 18 depicting the symbol "b", an upper mark 53 would be displayed adjacent the terminal edge 54. In the next rightward, or third position of the shaft 20, corresponding to the belt 18 depicting the symbol "c", no marks 53 would be displayed adjacent the terminal edge 54. This pattern would then repeat in three step intervals as the shaft 20 was withdrawn out of the housing 23.

As shown above, the individual markings 52 should preferably differ from one another, like the markings 53. To this extent, therefore, the depiction of the markings in the accompanying figures can essentially be regarded only as schematic, with respect to both their location on the longitudinal edges 50 and 51 and on the circumference of the control shaft 20. In other words, if each belt has a marking 52 which differs from other marking 52, the markings 53 can all form a single row on the shell of the control shaft 20, and it can then easily be possible to have the markings 52 on only one of the two longitudinal edges 50, 51. In this case, the space available and the ease with which the characters can be read play a significant role in the type of markings that can be used.

Figure 6:
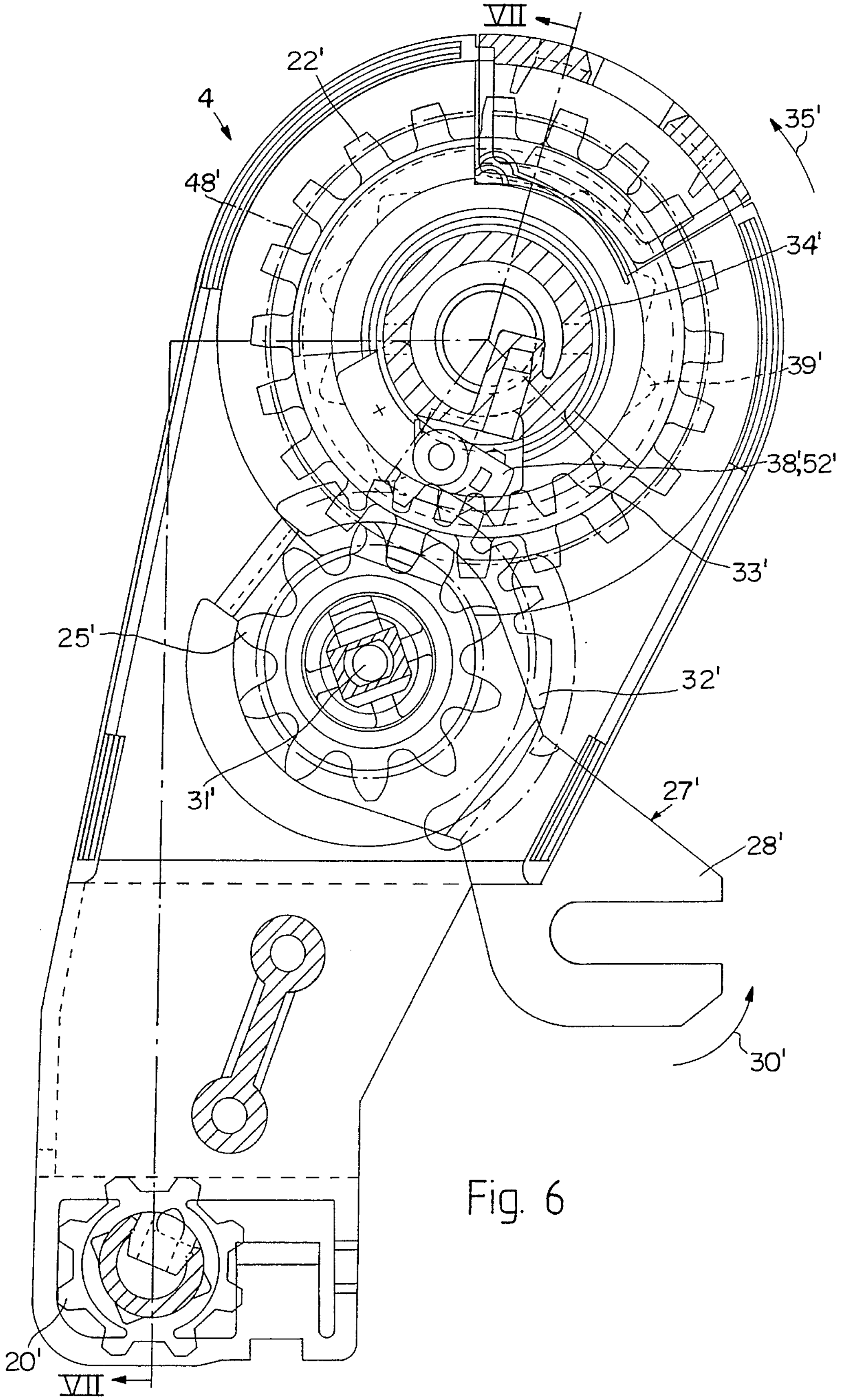
FIG. 6 shows, on an enlarged scale, additional components visible in a longitudinal section through the printing mechanism in FIG. 1, which is in the form of a belt printing mechanism.
Figure 7:
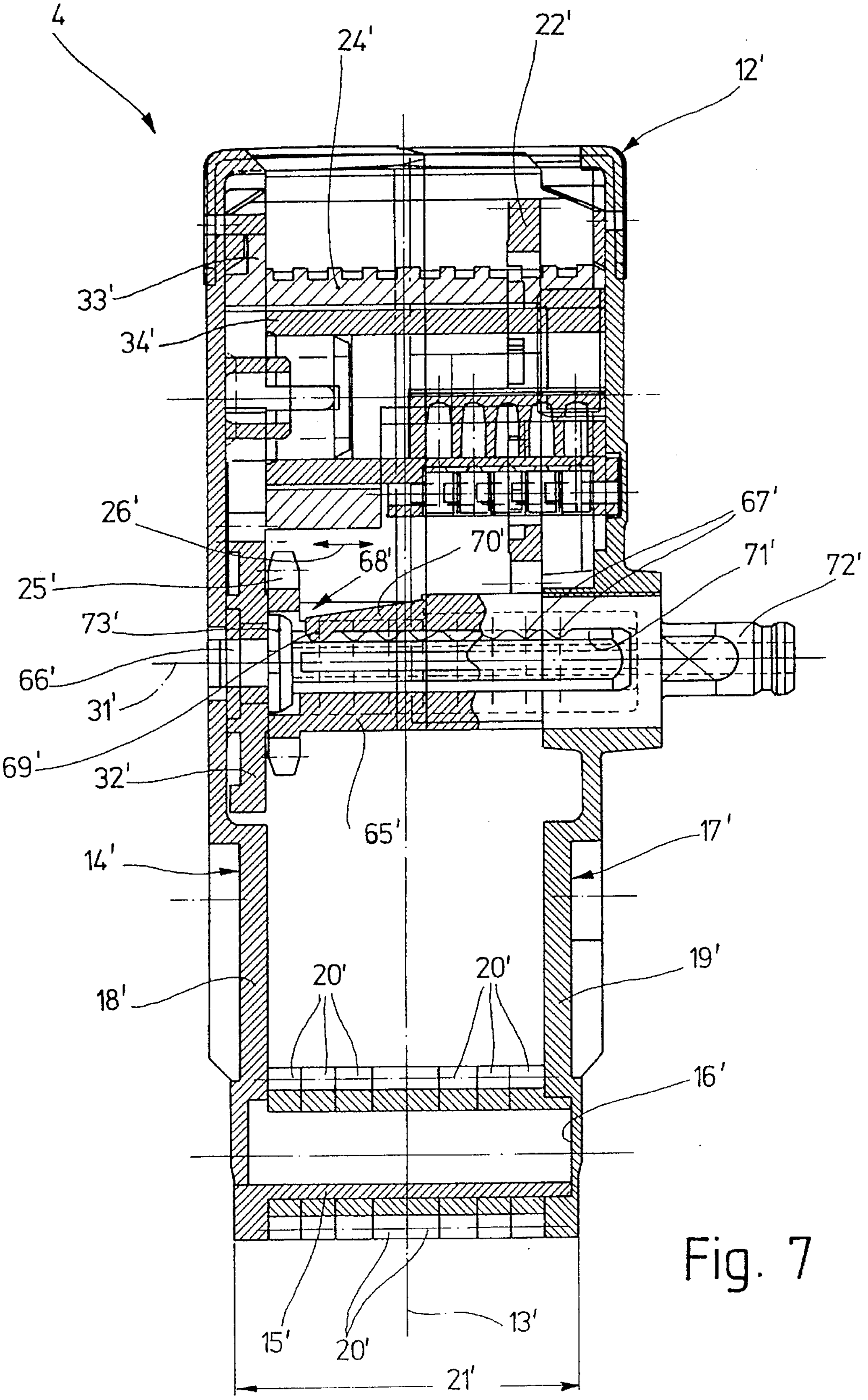
FIG. 7 shows, on a smaller scale, a shortened section along Line VII—VII in FIG. 6.
Figure 9:
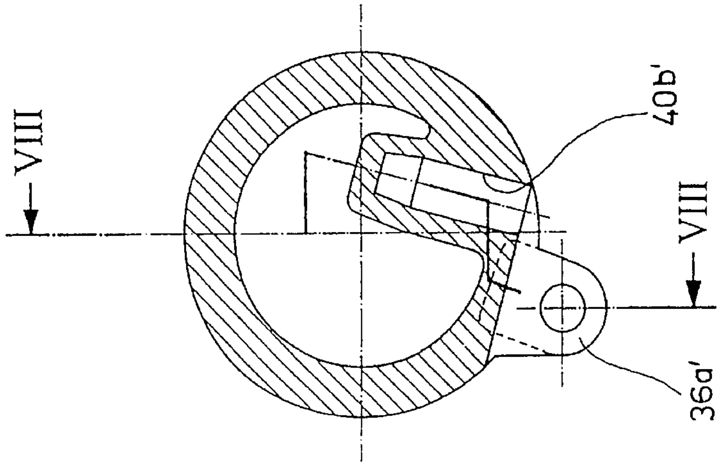
FIG. 9 shows a section along Line IX—IX in FIG. 8.

As shown in FIGS. 1 and 6, the printing mechanism of the depicted unit 1s a belt printing mechanism. For the sake of simplicity, only part of the printing mechanism is shown in FIG. 1. As shown in FIG. 7, the housing 12' of the printing mechanism can be divided in two along the plane 13'. A hollow bearing shaft 15' can be molded onto one part 14' of the housing 12'. The free end of this hollow bearing shaft 15' can preferably be engaged in a locator 16' of the other part 17' of the housing. The bearing shaft 15' can also be manufactured separately and fastened to the housing as appropriate. Between the housing walls 18' and 19' of the two parts 14' and 17' of the housing, there can be a whole series, or row, of small gear wheels 20' on the hollow bearing shaft 15'. These gear wheels 20' are the gear wheels of the printing mechanism 4 which are on the printing area side of the printing mechanism 4. Preferably only these gear wheels 20' can be located in the space between the housing walls 18' and 19'. Specifically, there can preferably be no additional wheels located there. Thus, the width 21' of the housing 12' in the lower area **26*a* thereof, i.e. in the area which is inside the labelling unit housing 2 (see FIG. 1), can essentially be determined by the number and the thickness of the gear wheels 20' and the wall thickness of the housing walls 18' and 19'**.

Corresponding to each small gear wheel 20' there can preferably be a large gear wheel 22', whereby all the large gear wheels 22' can be gear wheels which are distant from the printing area. Each small gear wheel 20' can preferably be driven and actuated by a corresponding large gear wheel 22' that is located in the same plane as the corresponding small gear wheel 20'. This drive can be achieved by means of an endless printing belt 23' (which essentially corresponds to belt 18 of FIG. 1). This belt 23' can preferably be a toothed belt, the teeth of which are engaged between teeth of the corresponding gear wheels 20' and 22'. On the outside of this belt 23', print symbols can be attached to suitable projections in a known manner. The print symbols can include the numbers "0–9", whereby two of each number can generally be attached to such a printing belt 23', one preferably opposite to the other, so that the print type which will be printed can correspond to a print type which is visible in the window 44 (see FIG. 4). In addition to numbers, the printing belt 23' can of course also contain other symbols. It is apparent that by turning one of the gear wheels by means of the printing belt, the other gear wheel would also be driven in the same direction of rotation.

In the depicted embodiment of FIG. 6, the large gear wheels 22' can be driven in a manner as described in greater detail below, so that the small gear wheels 20' are gear wheels which are driven only by the printing belt 23'. In FIG. 7, only the right gear wheel 22' is shown. In a metering unit, the right-most gear wheel 22' forms the units-wheel. At the tenth actuation step, the units-wheel, in a known manner, can preferably drive the gear wheel located immediately to the left thereof, for which reason the latter gear wheel is called the tens-wheel. To the left of the tens-wheel is the hundreds-wheel, and farther to the left is the thousands-wheel, etc. All the gear wheels 22' can preferably rotate freely on the hollow shaft 24', which hollow shaft 24' can be solidly fastened to the housing. To the left of the above-mentioned four gear wheels, there can be four additional gear wheels to drive four additional printing belts 23', each of which printing belts 23' may have symbols other than the numbers "0–9".

The large gear wheels 22' can be rotated in two different ways on the hollow shaft 24'. One possibility is that a pinion 25' can be rotated by hand, which pinion 25' can not only be rotated, but can also be displaced axially in the direction indicated by the double arrow 26' shown in FIG. 7. In this manner, the pinion 25' can be matched to each of the large gear wheels 22', and thus each of the wheels 22' can be rotated and set independently of one another. The rotation of the wheels 22' also results in the rotation of the printing belt 23'. As such, each symbol of each printing belt 23' can be matched to the printing area which is located underneath the small gear wheels 20'. A description of this embodiment is presented further herebelow to explain in detail how this adjustment can be made.

A second possibility provides for a step-wise rotation of at least some of the gear wheels 22'. Such a step-wise incrementation essentially involves the use of a stepping device, which is designated 27' in general in FIG. 6. A fork-shaped stepping lever on the free end of the stepping device 27' can preferably be coupled to a bolt (not shown) in the housing 2 of the hand-held labelling unit 1 (see FIG. 1). When, by actuating the hand lever 7, the printing mechanism 4 is caused to pivot in the direction indicated by the arrow 16, on account of the coupling of the forked end of the stepping lever 28', the stepping lever 28' can pivot around the geometric axis 31' in the direction indicated by the arrow 30' (FIG. 6). The stepping lever 28' is, however, preferably non-rotationally coupled to a wheel 32' which, in the embodiment, is a gear wheel which has teeth over only a part of its circumference. The teeth of wheel 32' preferably mesh with those of an additional wheel 33', which wheel 33' can also have teeth over only a portion of its circumference. The wheel 33' can be non-rotationally coupled to a drive shaft 34', which drive shaft 34' can be a component of the stepping device 27'.

Unless special precautions are taken, each pivoting of the print mechanism 4 in the direction of arrow 16 (FIG. 1), which pivoting results in a rotation of the units-wheel in the direction indicated by the arrow 35', will accordingly result in an actuation step. At the tenth actuation step, as noted above, the neighboring wheel, i.e. the tens-wheel, can be driven, etc. In the depicted embodiment, only the four right gear wheels 22', distant from the printing area, are actuated in this manner by the stepping mechanism 27', while the remaining four gear wheels 22' can only be adjusted by hand, by a fixed value, by means of the pinion 25'. The value set on the remaining four gear wheels remains in place until these gear wheels are reset by hand. In a further embodiment of the device, all of the print wheels could be actuated by the stepping mechanism 27'.

Figure 8:
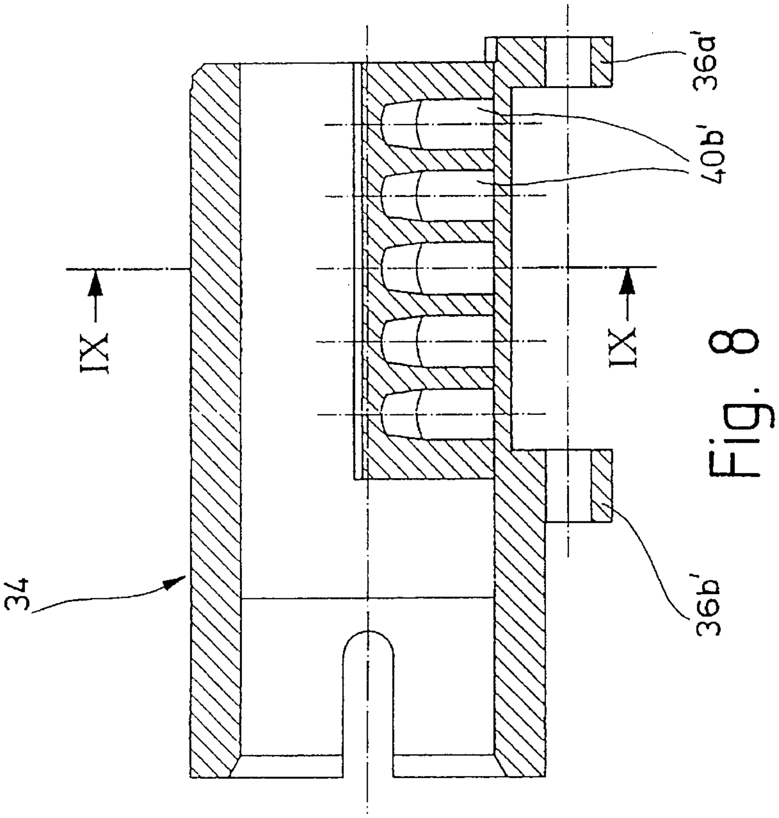
FIG. 8 shows a longitudinal section through the drive shaft of the stepping device.
Figure 10:
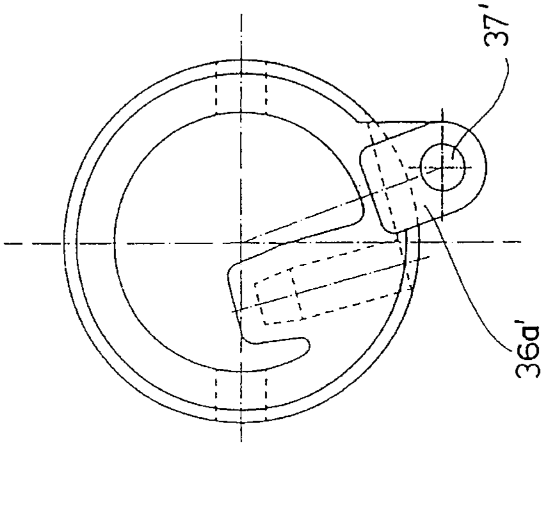
FIG. 10 shows a view of the right end surface of the drive shaft.
Figure 11:
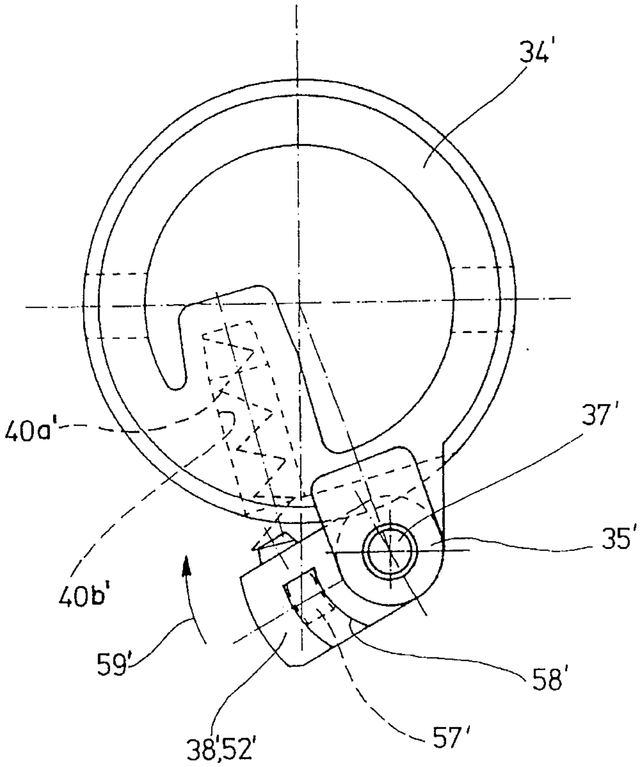
FIG. 11 shows, on an enlarged scale, the same view as in FIG. 10, but with a latch.
Figure 15:
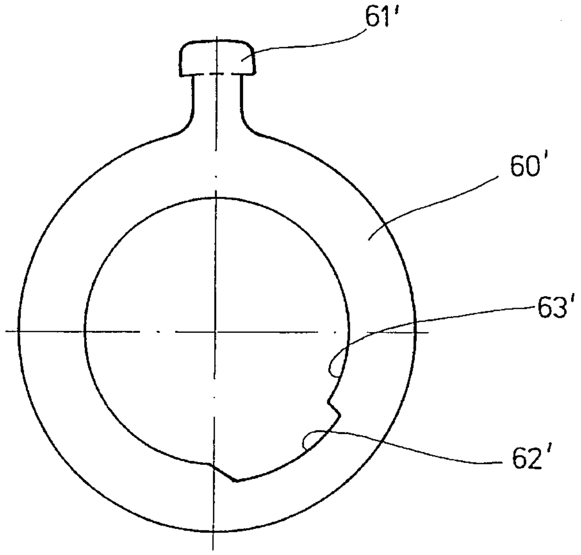
FIG. 15 is a side view of a mechanical indexing ring.

FIG. 8 shows a longitudinal section through the hollow shaft 34', which hollow shaft 34' can preferably be solidly fastened to the housing. This hollow shaft 34' can also be called the actuator sleeve. It can be seen that the hollow shaft 34', on the right-hand end and in the middle region thereof, can preferably have projecting bearing lugs 36*a*' and 36*b*' respectively. In the illustrated embodiment, there are five spring-loaded latches 38' pivotably mounted on a shaft 37', which shaft 37' can be inserted into this sleeve 34' (FIG. 11). Four of the latches 38' work with latch locators 39' of the corresponding gear wheel 22' (see FIGS. 6 and 12). The latch 38' which corresponds directly to the housing wall 19' (FIG. 7) performs a special function, which will be described in detail below. The steps are selected so that the latch 38', after each operating stroke of its gear wheel 22', enters the next latch locator 39', in the circumferential direction, as a result of the force of the spring which provides its spring loading. As shown in FIG. 11, springs 40*a*' of the latches 38', all of which can preferably be designed as coil compression springs, are each located in a hole 40*b*' of an inner shoulder of the drive shaft 34'.

There are latch locators 39' on all of the gear wheels 22'. The shape of the four gear wheels 22' which would be disposed on the left in FIG. 7, which are index wheels, can therefore differ to some extent from the shape of the four gear wheels 22' which are disposed on the right, which are notched wheels, as explained above. The latch locators of the index wheels are designed symmetrical to the radii of these wheels, while the shape of the four gear wheels 22' on the right in FIG. 7 can differ from index wheels to some extent, to improve the actuation and driving of the other wheels.

FIG. 12 shows a radial section through a ratchet, or gear wheel 22'. The latch locators 39' extend only over one-half of the thickness of the wheel, while in contrast, they extend through the entire thickness of the index wheels. With regard to the tens-stepping, however, one of the ten latch locators 39' of the right-hand ratchet wheels 22' also extends over the entire thickness of the wheel on the right-hand ratchet wheels.

The hollow shaft 24', fastened to the housing, can be provided, over a portion of its length, with a radial passage 41*a*', the edge of which is open toward the end facing the housing wall 17'. The passage 41*a*' can be used for the passage of the latches 38', and accordingly extends only over the area which has latches.

Opposite the passage 41*a*', on the hollow shaft 24', there can be a depression 41*b*' in which several detent elements 42', shown on top of one another in the drawing, can enter, each of which detent elements 42' can be molded onto a leaf spring 43'. The leaf springs can be combined into a comb-like structure, which can be riveted by means of rivets 44' to a shoulder of the depression 41*b*'. Each detent element 42' can be engaged in one of the latch locators 39' of the corresponding gear wheel. Because the detent elements 42' are arranged abreast, that is, in alignment immediately adjacent one another, the result can be an orientation of all the teeth of all the gear wheels, also abreast, or in alignment. In this manner, a precise orientation of all the symbols of the printing belts 23' can also be achieved. FIG. 13 also shows an external collar 45', the two ends of which forms stops 46' and 47' for the wheel 33', which wheel 33' can have teeth over only a portion of its circumference, can be non-rotationally connected to the drive shaft of the stepping device, and can, in particular, be molded integrally to the drive shaft, whereby the wheel 33' can be made of plastic.

Inserted on the hollow shaft 24', on the free end facing the housing wall 19', there can be a control device 48', by means of which the number of pivoting movements of the stepping lever 28' can be specified, which causes an indexing movement of the belt or belts 23'. Depending on the setting of this control device 48', the units-wheel can be made to advance by one step, e.g. after each pivoting movement of the stepping lever 28', or only after each second pivoting movement of the lever.

As shown in FIG. 14, the essential elements of this control device 48' are a ring-shaped notched disc 49' which can be rotationally mounted on the hollow shaft 24', and a control ring 50' which can be rotationally fastened to the notched disc 49' so that the control ring 50' can be actuated in angular, or rotational stages. On the inside circumference of the control ring 50', there can be index notches 51'. For the tens counter, there are ten index notches 51'. A control device latch 52' (FIGS. 6 and 11) can be inserted in the index notches 51' as desired. In the illustrated embodiment, this control device latch 52' is designed the same as the latches 38' and is immediately next to the bearing lug 36*a*' (FIG. 8). This latch 52' can also be spring-loaded. On the outside circumference of the control ring 50', there can be additional index notches 53'. In the above-mentioned embodiment, there are twenty such index notches 53'. Of course, all the notches, teeth etc. should preferably be uniformly distributed over the circumference. A detent element 54', which is molded onto a flexible tab 55', is engaged in each of two of the additional index notches 53', which are preferably offset by about 180 degrees on the circumference. Both can preferably be made of plastic and can be integral with the notched disc 49'. The control ring 58' can also preferably be made of plastic. By means of the detent elements 54' and the additional index notches 53', the notched disc 49' and the control ring 50' can be stopped in stages relative to one another.

On the inside circumference of the notched disc 49', there can be five locking teeth 56' which project radially inward and are also uniformly distributed over the circumference. In the direction of rotation of the control ring 50' illustrated in FIG. 14, the five locking teeth, each corresponding to an index notch 51' of the control ring 50', are located on the notched disc 49', so that the control device latch 52' cannot enter into these index notches 51'. That means that the control device latch 52' can only catch after every second actuation of the stepping lever 28', and thus, the control device consequently requires two adjustment movements, or printings, of the printing mechanism 4, or two pivoting movements of the stepping lever 28' in the direction indicated by arrow 30' (FIG. 6) to advance the units-wheel by one step. The mode of operation is described below.

on the underside of each latch 38', 52', there can preferably be a driver 57', shown projecting downward in FIG. 11. Opposite the driver 57', on each latch, there can be a notch 58' which has open edges. If the control device latch 52' (FIG. 6) is pivoted inward, i.e. in the direction indicated the arrow 59', its driver 57', which then engages in the notch of the latch 38' located underneath the driver, thus drives this latch 38' in the direction indicated by the arrow 59'. In this manner all the latches 38', 52' are pivoted in the direction indicated by the arrow 59', so that the latch will no longer be latched with its index notch 51' or 39' respectively. Then, if the drive shaft 34' is rotated by means of the stepping lever 28' by one actuation step, none of the wheels 22' would be driven, but an idle step occurs. Then it is possible for the index notch 51' to enter into the next non-latched index notch 51'. Consequently, the latch 38' of the units-wheel can enter its latch locator 39', so that the latch 38' can be driven with the next actuation step of the stepping lever 28'. After each ten actuation steps, the next latch 38' can be released in a known manner, so that its tens-wheel can then also execute an advance step.

As noted above, the control ring 50' can be rotationally mounted on the notched disc 49', whereby there are twenty actuation steps in this regard. If, starting from the position illustrated in FIG. 14, the control ring 50' is advanced by one step, the five locking teeth 56' arrive in an intermediate position between two neighboring index notches 51', and the teeth 56' can thus not prevent the pivoting of the control apparatus latch 52'. Consequently, each advance step of the stepping lever 28' results in an advance step of the units-wheel. The locking teeth 56' can also act as bearing elements for the notched disc 49' on the hollow shaft 24'. Moreover, an additional leaf spring 43', with a detent element 42' (FIG. 13), can also be provided in the vicinity of the control device 48'. The detent element 42' then interacts with each of the index notches 51' of the control ring 50', and in this manner produces a rotational orientation of the control device 48' in relation to the gear wheels 22' which are distant from the printing area.

An additional actuator ring 60' (FIG. 15) of a mechanical actuator can also be inserted on the hollow shaft 24', on the free end of the shaft 24' which projects beyond the control device, i.e., between the control device 48' and the housing wall 19' of the printing mechanism 4. On the actuator ring 60', there is an actuation shoulder 61' which projects outward beyond the housing of the printing mechanism 4 and serves as the lever 47 discussed above with reference to FIG. 4. Also corresponding to this ring 60', there can be a groove-like recess 62' on the inside, in which recess 62' the control device latch 52' can be engaged when this actuator ring and thus also the mechanical actuator are in their actuating position. In this manner, it is possible for the control device latch 52' to enter into a matching released index notch 51'. But if the actuator ring 60' is rotated, the control device latch 52' moves out of the groove-like recess 62' and is then in contact with the hole 63' of the actuator ring 60'. This movement of the control device latch 52' out of the recess 62' preferably results in the release of the control device latch 52' from its index notch 51', and thus all the gear wheels 22' remain stationary when the drive shaft 34' is rotated. The same is also true, consequently, for the printing belts 23' and the small gear wheels 20', which small gear wheels 20' also lock after each actuation step. In this angular position of the actuator ring 60', the same line of print is printed on each of the labels each time the hand lever 7 is actuated.

It should also be noted that on the outside circumference of the notched disc 49' there can be a large number of notches 74' which are accessible from outside the housing by means of an aperture in the housing of the printing mechanism 12'. By means of a suitable tool, e.g. a smell screwdriver which can be inserted into the next accessible notch 74', the notched disc 49' can be rotated, preferably in the direction indicated by the arrow 64, to the next locked position. The aperture slot (window portion 46 of FIG. 4) for the actuator shoulder 61' of the actuator ring 60' can be sized so that its two ends—viewed in the circumferential direction—form stops for the actuator ring 60', whereby the corresponding symbols, e.g. "ON" and "OFF" or "0" end "1" (as discussed previously) can preferably be applied to the housing at that point.

As noted above, the geometric pivoting axis 31' of the stepping lever 28' simultaneously forms the geometric axis of an actuating shaft 65' for the individual setting of the pulley wheels 22' of the belt printing mechanism 4 (see FIG. 7). On the end of the actuating shaft 65' closer to the stepping lever, the actuating shaft 65' supports the pinion 25', which pinion can be selectively coupled to each of the gear wheels 22'. To make this possible, the actuating shaft 65' can be mounted so that the shaft 65' can be displaced in the direction indicated by the arrow 26' and locked to a guide shaft 66'. The guide shaft 66' can be rotationally mounted on the housing wall 18' and preferably has a non-round, in particular, a square cross section, so that the actuating shaft 65' can only be displaced laterally on the shaft 66', and cannot be rotated.

Located in a row on the guide shaft 66' there can be index notches 67', the lateral distance between which corresponds to the thickness of the gear wheels 22'. The index notches 67' are arranged so that in each locking position of the actuating shaft 65' on the guide shaft 66', the pinion 25' exactly corresponds to one of the gear wheels 22'. A corresponding longitudinal locking device 68', formed by index notches 67' and a locking latch 69' on a flexible arm 70', can preferably be manufactured in one piece with the actuating shaft 65' and can project into the rectangular hole 71' of the actuating shaft 65'. An actuator device, e.g. a rotating knob, can be fastened to the pin-shaped end 72' of the actuating shaft 65', which end 72' can project beyond the housing of the printing mechanism 4. Markings (such as markings 53 as discussed above with reference to FIG. 4) can also be made on the outside of the actuating shaft 65', which markings become visible when the actuating shaft 65' is pulled out of the housing of the printing mechanism 4 and make it easier to locate the gear wheel 22 which is desired to be adjusted. It should also be added that the wheel 32' of the drive device for the drive shaft 34' can be rotationally mounted on the end of the guide shaft 66', which guide shaft 66' can be rotationally mounted on the wall 18'. The wheel 32' can be axially secured by means of a collar 73' of the guide shaft 66' and by the wall 18'. The collar is located by means of the shoulder-like expansions of the hole of the actuating shaft 65' in the vicinity of the pinion 25'.

The hand-held labelling unit described above is equipped with a belt printing mechanism, whereby a belt has two sets of the numbers "0–9", for example, i.e. each belt is provided with twenty symbols. When the preceding description of the embodiment speaks of twenty notches 74' or ten index notches 51' and five locking teeth 56', it is referring to an embodiment in which there are twenty symbols on the printing belt 23'. If the printing belt has more symbols, or even only half that number of symbols, a technician skilled in the art will easily be able to determine how many latches, notches or locking teeth etc. must be used in each case.

One feature of the invention resides broadly in the printing mechanism, preferably for a hand-held labelling unit, the housing 23 of which encloses a belt or wheel printing mechanism 4 and an axially movable control shaft 20 for the individual belts 18 or wheels, whereby the housing 23 is divided into two parts in a plane parallel to the plane of the belts or wheels, characterized by the fact that the two housing parts 28, 29 are held together by at least one clamp-type holder 24, which overlaps or covers all the belts 18 or wheels and the two housing walls 30, 31 which are parallel to the plane of the belts or wheels.

Another feature of the invention resides broadly in the printing mechanism characterized by the fact that the plane of separation 27 is located approximately in the middle of the housing.

Yet another feature of the invention resides broadly in the printing mechanism characterized by the fact that the holder 24 is located in an area 26 of the housing which is opposite the print-type 17, or working area, of the belts 18 or wheels.

Still another feature of the invention resides broadly in the printing mechanism characterized by the fact that the two housing parts 28, 29 are held together at the end near the print type 17, or working area end, by means of a screw 43 or similar element, the geometric axis of which runs parallel to the geometric axis of the wheels or pulley wheels 25 or the belts 18 of the printing mechanism 1.

A further feature of the invention resides broadly in the printing mechanism characterized by the fact that the two housing halves 28, 29 are oriented in relation to one another by means of centering edges or similar elements.

Another feature of the invention resides broadly in the printing mechanism characterized by the fact that the housing 23 and the holder 24 are connected to one another by a snap closure or a locking closure.

Yet another feature of the invention resides broadly in the printing mechanism characterized by the fact that the holder 24 has two parallel clips 32, 33, each of which has at least one snap locator 39, 40 and that on the locking side of each of the parallel side walls 30, 31, there is a locking element 41 of an appropriate shape, in particular molded in, or vice-versa.

Still another feature of the invention resides broadly in the printing mechanism characterized By the fact that the clips 32, 33 are inserted flush into the side walls 30, 31, whereby as a rule, in front of the free end of at least one clip 32, on the side wall, there is a bevelled edge 42 for disassembly, where a disassembly tool, in particular a screwdriver of similar element, can be inserted.

A further feature of the invention resides broadly in the printing mechanism characterized by the fact that the middle piece 35 of the essentially U-shaped clamp-shaped holder 24 is inserted into a housing passage 36 so that it is flush on the outside, end has the shape of a frame, the outer surface of which is preferably a partial surface of a cylindrical shell.

Another feature of the invention resides broadly in the printing mechanism characterized by the fact that the inside contour of the frame 35 forms a window 24, in which a complete row of symbols 22 is visible.

Yet another feature of the invention resides broadly in the printing mechanism characterized by the fact that on at least one of the longitudinal edges 50, 51 of the window 44, there are markings 52 or lines, dots or numbers, whereby one marking corresponds to each symbol of the visible row of symbols, and that there are corresponding, preferably identical markings 53 on the control shaft 20 in a similar or identical arrangement.

Still another feature of the invention resides broadly in the printing mechanism characterized by the feat that corresponding to the frame-shaped middle piece 35 of the holder 24, there is a group of belts or wheels of the belt or wheel printing mechanism 4, and that next to one of the outer belts or wheels in the axial direction, there is a control wheel 45 of an advancing mechanism, which control wheel 45 is accessible by means of the frame window 44, and a corresponding rotating control lever 47, whereby the control lever 47 projects out of the frame, and in this area, the window 44 is generally wider 46 in the circumferential direction.

A further feature of the invention resides broadly in the printing mechanism characterized by the fact that on both circumferential ends of the widened portion 46 of the window, there are lateral snap locators 48, 49 for the control lever 47, and the control lever 47 can be elastically curved or bent.

Another feature of the invention resides broadly in the printing mechanism characterized by the fact that for each defined position of the control lever 47, there is a corresponding marking on the holder 24.

Some examples of portable, hand-held labelling devices and the components thereof, which could possibly be used in conjunction with the labelling device according to the present invention, might be or are disclosed by the following U.S. patents: U.S. Pat. No. 5,258,090 to Becker and Yolk, entitled "Hand-Held Portable Labelling Device and the Inking Roller Mounting Therefor"; U.S. Pat. No. 5,160,943 to Pettigrew et al., entitled "Printing System"; U.S. Pat. No. 4,853,068 to Werner Becker, entitled "Hand Labeling Device"; and No. U.S. Pat. No. 4,793,889 to Werner Becker, entitled "Hand Labeling Device"; all of which are assigned to the assignee of the present invention.

Other examples of portable, hand-held labelling devices and the components thereof, which could possibly be used in conjunction with the labelling device according to the present invention, might be or are disclosed by the following U.S. patents: U.S. Pat. No 5,254,206 to Donald Wing, entitled "Hand-Held Labeling Device"; U.S. Pat. No. 4,813, 355 to Edward Stork, entitled "Hand-Held Printing and Labelling Device"; U.S. Pat. No. 4,704,185 to Richard Fischer, entitled "Hand-Held Dispenser and Applicator Apparatus for Dispensing Adhesive Labels, and the Like"; U.S. Pat. No. 4,690,723 to Paul Hamisch, entitled "Hand-Held Labeler"; U.S. Pat. No. 4,680,078 to Vanderpool and Bain, entitled "Hand-Held Labeler Having Improved Web Position Sensing and Print Head Control"; U.S. Pat. No. 4,668,326 to John Mistyurik, entitled "Hand-Held Labeler"; and U.S. Pat. No. 4,660,739 to Dooley and Bredeweg, entitled "Label Dispenser".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 08 462.5, filed on Mar. 12, 1994, having inventor Heinrich yolk, and DE-OS P 44 08 462.5 and DE-PS P 44 08 462.5, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hand-held, portable labelling device for printing a print-type image on a label, said labelling device comprising:

a first housing;

handle means for gripping said labelling device in a hand; printing means removably disposed within said first housing for printing on a label to produce a printed label, said printing means being movable in a direction towards and away from the label;

means for actuating said printing means to move said printing means towards and away from the label;

means for providing ink to said printing means;

means for supplying labels;

means for feeding labels from said label supply means to said printing means;

said printing means comprising:

a second housing, said second housing comprising a first housing portion and a second housing portion, said first housing portion and said second housing portion together defining an interior space therebetween, said first housing portion defining a housing wall, and said second housing portion defining a housing wall, said housing wall of said first and second housing portions being disposed substantially parallel to one another;

print-type disposed in said interior space of said second housing for printing on the label;

means for selectively positioning the print-type for printing on the label; and means, being disposed about at least a part of said housing wall of each of said first and second housing portions, for holding together said first and second housing portions at least about said holding means; and said holding means comprising a substantially U-shaped clamping member, said substantially U-shaped clamping member comprising:

a base portion with first and second legs extending from said base portion;

said first leg comprising means for releasably engaging said at least a part of said housing wall of said first housing portion;

said second leg comprising means for releasably engaging said at least a part of said housing wall of said second housing portion; and said base portion comprising means for positioning said first and second legs of said holding means with respect to one another for pressing together said first and second housing portions.

2. The labelling device according to claim 1 wherein:

said printing means comprises at least one wheel, said at least one wheel having a periphery, and said at least one wheel comprising print-type disposed about at least a portion of the periphery;

said at least one wheel defines a plane, said at least one wheel being rotatable within the plane, and said plane of said at least one wheel being disposed substantially parallel to and between said housing walls of said first and second housing portions;

said housing wall of each of said first and second housing portions define a plane and a periphery thereabout in the plane of said housing wall;

said first and second housing portions each comprise side wall portions extending from said housing wall thereof and disposed about at least a substantial portion of the periphery of said housing wall;

said side wall portions being disposed substantially perpendicular to said housing wall, said side wall portions of each of said first and second housing portions having a first edge contacting said housing wall and a second edge disposed away from said housing wall and adjoining a second edge of said side wall portion of the other of said first and second housing parts;

said print-type is disposed about at least a semi-circular portion of the periphery of said at least-one wheel; and said side wall portions are disposed immediately adjacent said periphery of said at least one wheel about at least a semi-circular portion of said periphery.

3. The labelling device according to claim 2, wherein:

said first and second housing portions together define a substantially U-shaped opening therein;

said housing wall and said side wall portions of said first and second housing portions define an edge bordering said substantially U-shaped opening;

said housing wall and said side wall portions of said first and second housing portions having a thickness;

said edge bordering said opening having a thickness, the thickness of said edge being less than the thickness of said housing wall and said side wall portions;

said substantially U-shaped clamping member having a peripheral edge disposed thereabout, said peripheral edge of said substantially U-shaped clamping member adjoining said edge of said substantially U-shaped opening;

said substantially U-shaped clamping member having an outer surface;

said second housing having an exterior surface; and said peripheral edge of said substantially U-shaped clamping member being configured for adjoining said edge bordering said opening with said outer surface of said substantially U-shaped clamping member such that said outer surface is disposed flush with said exterior surface of said second housing.

4. The labelling device according to claim 3, wherein:

said edge bordering said opening defines a first distance between said edge to the exterior surface of said second housing, said distance plus said thickness of said edge defining the thickness of said housing walls and said side wall portions;

said peripheral edge of said substantially U-shaped clamping member having a thickness, said thickness of said peripheral edge being substantially the same as the first distance; and said first and second legs of said substantially U-shaped clamping member and said parts of said housing walls overlapped by said first and second legs together comprise a snap-in connection for retaining said substantially U-shaped clamping member in position about said second housing.

5. The labelling device according to claim 4, wherein:

said first and second legs of said substantially U-shaped clamping member each have an end disposed away from said base portion;

said end comprising at least one of:

a projection; and a recess;

said parts of said housing wall of each of said first and second housing portions overlapped by said first and second legs comprise the other of:

a projection; and a recess;

said projection and said recess comprise said snap-in connection;

at least one of said housing walls of said first and second housing portions comprises, adjacent said snap-in connection, a bevel for reducing the thickness of said at least one housing wall to the thickness of said edge bordering said opening; and said bevel being configured for permitting a tool to be inserted between said at least one housing wall and an overlapped one of said first and second legs to lift said overlapped one of said first and second legs away from said at least one housing wall to open said snap-in connection.

6. The labelling device according to claim 5, wherein:

said substantially U-shaped clamping member comprises a thickness over a substantial portion thereof, the thickness of the substantial portion being greater then the thickness of said peripheral edge, the thickness of the substantial portion being about the same as the thickness of said housing wall and said side wall portions;

said peripheral edge comprises a stepped edge;

the at least one wheel comprises a plurality of wheels rotatable about a common axis, each of said plurality of wheels having print type disposed about at least a portion thereof;

said base portion of said substantially U-shaped clamping member defines a window therein for viewing the print-type disposed about the plurality of wheels, the viewed print-type representing the image to be printed;

said base portion comprises reference markings disposed along the window, with at least one reference marking being aligned with and corresponding to each of said plurality of wheels;

each of said plurality of wheels comprises an external toothing;

said means for selectively positioning the print-type comprises shaft means disposed adjacent said plurality of wheels and parallel to said common axis, said shaft means being movable in a direction parallel to said common axis, said shaft means comprises an externally toothed gear for engaging said external toothing of said plurality of wheels, one independently of another;

said shaft means having a portion extending out of said second housing;

said shaft means being rotatable via said extending portion to rotate an engaged one of said plurality of wheels; and said shaft means comprising, along said extending portion, reference markings corresponding to said reference markings of said base portion, and indicating means for indicating a reference marking of said shaft means for indicating which of said plurality of wheels is engaged by said shaft means.

7. The labelling device according to claim 6, wherein:

said print-type comprises a series of print-type disposed one after the other about the at least a portion of said at least one wheel;

said wheels being rotatable to advance the print-type through said printing means;

said printing means comprises means for step-wise advancing of at least one of said plurality of wheels to rotate the at least one of said plurality of wheels an amount sufficient for displacing the print-type by one;

said means for advancing comprises at least one advancing wheel disposed adjacent said at least one of said plurality of wheels advancable by said means for advancing;

said printing means further comprises means for disengaging said means for advancing, said means for disengaging comprising lever means; and said window of said base portion of said substantially U-shaped member comprising a window portion for passage of said lever means therethrough.

8. The labelling device according to claim 7, wherein:

said window has a longitudinal dimension disposed across each of said plurality of wheels;

said window portion has a circumferential dimension disposed substantially transverse to the longitudinal dimension of said window;

said lever means being movable from a first position to at least a second position within said window portion, said first position being for engaging said means for advancing with said at least one of said plurality of wheels, and said second position being for disengaging said means for advancing with said one of said wheels;

said window portion comprises catch means for retaining said lever means in each of said first and second positions;

said lever means being elastically prestressed to engage with said catch means;

said base portion adjacent said window portion comprises a marking corresponding to each of said first and second positions to indicate the status of engagement for said means for advancing;

said second edge portions of said first housing portion adjoins said second edge portions of said second housing portion along a plane, said plane being disposed substantially parallel to said plane of said at least one wheel;

said second housing has a center between said first and second parallel housing walls;

said second edges of said side wall portions adjoin substantially in said center;

said second housing of said printing means comprises a first portion for being inserted into said first housing of said labelling device, and a second portion for being disposed out of said first housing;

said first portion of said second housing comprising a printing portion of said printing means;

said plurality of wheels being disposed in said second portion of said second housing;

said second housing additionally comprises, at said first portion thereof, at least one additional holding means, said at least one additional holding means comprising at least one of:

an additional U-shaped clamping member for engaging said housing wall of each of said first and second housing portions; and a screw, said screw being disposed substantially parallel to said common axis of said wheels and substantially perpendicular to said plane of said wall portions of said first and second housing portions and extending between said first and second housing portions;

said second edge of said side wall portions of each of said first housing portion and said second housing portion comprise a portion for overlapping a complementary portion of said second edge of said side wall portion of the other of said first and second housing portion, said overlapping portions comprising means for fixing said first and second housing portions against movement in a direction parallel to said plane of said at least one first wheel;

said first portion of said second housing additionally comprises a plurality of guide wheels, said plurality of guide wheels being disposed adjacent one another and rotatable about a common axis;

said common axis of said guide wheels being substantially parallel to said common axis of said plurality of wheels in said second portion of said second housing;

one each of said plurality of guide wheels being aligned with one each of said plurality of wheels;

said print-type comprises belt means disposed about said at least a portion of said plurality of wheels and extending between said aligned ones of said guide wheels and said wheels and disposed about at least a portion of said guide wheels;

said belt means having an inwardly disposed surface disposed towards said wheels and said guide wheels, and an outwardly disposed surface opposite said inwardly disposed surface;

said outwardly disposed surface comprising print-type disposed thereon;

said inwardly disposed surface comprising toothing corresponding to said toothing of said plurality of wheels;

said handle means of said first housing comprises a first handle portion rigidly attached to said first housing and a second handle portion movable towards and away from said first handle portion;

said second handle portion comprises a lever extending from said second handle portion of said printing means;

said labelling device further comprises a printing surface on which labels are printed by said print-type disposed about said guide wheels;

said means for actuating said printing means comprises said second handle portion and said lever portion of said second handle portion to move said printing means towards said printing surface upon movement of said second handle portion towards said first handle means and for movement of said printing means away from said printing surface upon movement of said second handle portion away from said first handle means;

said labels comprise labels disposed on a peel-away backing; and said labelling device further comprises a dispensing edge for peeling the printed labels from the peel-away backing.

9. A hand-held, portable printing device for printing a print-type image, said printing device comprising:

a first housing;

handle means for gripping said printing device in a hand;

printing means removably disposed within said first housing for printing on a surface to produce a printed print-type image, said printing means being movable in a direction towards and away from the surface;

means for actuating said printing means to move said printing means towards and away from the surface;

means for providing ink to said printing means;

said printing means comprising:

a second housing, said second housing comprising a first housing portion and a second housing portion, said first housing portion and said second housing portion together defining an interior space therebetween;

print-type disposed in said interior space of said housing for printing on the surface;

means for selectively positioning the print-type for printing on the surface; and means, being disposed about at least a part of each of said first and second housing portions, for holding together said first and second housing portions at least about said holding means; and said holding means comprising:

a first portion for releasably engaging said at least a part of said first housing portion;

a second portion for releasably engaging said at least a part of said second housing portion; and means for positioning said first and second portions of said holding means with respect to one another for pressing together said first and second housing portions;

said printing means comprising at least one wheel, said at least one wheel having a periphery, and said at least one wheel comprising print-type disposed about at least a portion of the periphery;

said at least one wheel defining a plane, and said at least one wheel being rotatable within the plane;

said first and second housing portions each defining a longitudinal dimension;

said longitudinal dimension of each of said first and second housing portions being disposed substantially parallel to said plane of said at least one wheel;

said means for positioning said first and second housing portions with respect to one another defining a longitudinal dimension extending between said first and second portions of said holding means, said longitudinal dimension of said means for positioning being disposed substantially transverse to said plane of said at least one wheel to position said first portion of said holding means about said at least a part of said first housing portion to releasably engage said first housing portion and to position said second portion of said holding means about said at least a part of said second housing portion to releasably engage said second housing portion;

said first housing portion defining a housing wall disposed substantially parallel to said plane of said at least one wheel;

said second housing portion defining a housing wall disposed substantially parallel to said plane of said at least one wheel;

said at least a part of said first housing portion comprising at least a part of said housing wall of said first housing portion;

said at least a part of said second housing portion comprising at least a part of said housing wall of said second housing portion; and said holding means comprising a substantially U-shaped clamping member, said substantially U-shaped clamping member having a base portion with first and second legs extending from said base portion, said base portion comprising said means for positioning, and said first and second legs respectively comprising said first and second portions of said holding means.

10. The printing device according to claim 9, wherein:

said base portion of said substantially U-shaped clamping member extends from said housing wall of said first housing portion to said housing wall of said second housing portion;

said first leg of said substantially U-shaped clamping member overlaps at least a part of said housing wall of said first housing portion; and said second leg of said substantially U-shaped clamping member overlaps at least a part of said housing wall of said second housing portion.

11. The printing device according to claim 10, wherein:

said housing wall of each of said first and second housing portions defines a periphery thereabout in the plane housing wall;

said first and second housing portions each comprise side wall portions extending from said housing wall thereof and disposed about at least a substantial portion of the periphery of said housing wall;

said side wall portions being disposed substantially perpendicular to said housing wall, said side wall portions having a first edge contacting said housing wall and a second edge disposed away from said housing wall;

said print-type is disposed about at least a semi-circular portion of the periphery of said at least one wheel; and said side wall portions are disposed immediately adjacent said periphery of said at least one wheel about at least a semi-circular portion of said periphery.

12. The printing device according to claim 11, wherein:

said second edge portions of said first housing portion adjoins said second edge portions of said second housing portion along a plane, said plane being disposed substantially parallel to said plane of said at least one wheel;

said second housing of said printing means comprises a first portion for being inserted into said first housing of said printing device, and a second portion for being disposed out said first housing;

said first portion of said second housing comprising a printing portion of said printing means;

said at least one wheel comprises at least one wheel disposed in said second portion of said second housing, said at least one wheel defines an axis of rotation substantially perpendicular to said plane of said at least one wheel; and said second housing additionally comprises, at said first portion thereof, at least one additional holding means, said at least one additional holding means comprising at least one of an additional U-shaped clamping member for engaging said housing wall of said first and second housing portions; and a screw, said screw being disposed substantially parallel to said axis of rotation and substantially perpendicular to said plane of said at least one wheel and extending between said first and second housing portions.

13. The printing device according to claim 12, wherein:

said second housing has a center between said parallel housing walls of said first and second housing portions;

said second edges of said side wall portions adjoin substantially in said center;

said second edge of said side wall portions of each of said first housing portion and said second housing portion comprise a portion for overlapping a complementary portion of said second edge of said side wall portion of the other of said first and second housing portion, said overlapping portions comprising means for fixing said first and second housing portions against movement in a direction parallel to said plane of said at least one wheel; end said first and second legs of said substantially U-shaped clamping member and said parts of said housing walls overlapped by said first and second legs together comprise a snap-in connection for retaining said substantially U-shaped clamping member in position about said second housing.

14. The printing device according to claim 13, wherein:

said first and second housing portions together define a substantially U-shaped opening therein;

said housing wall and said side wall portions of said first and second housing portions define an edge bordering said substantially U-shaped opening;

said housing wall and said side wall portions of said first and second housing portions having a thickness;

said edge bordering said opening having a thickness, the thickness of said edge being less than the thickness of said housing wall and said side wall portions;

said substantially U-shaped clamping member having a peripheral edge disposed thereabout, said peripheral edge of said substantially U-shaped clamping member adjoining said edge of said substantially U-shaped opening;

said substantially U-shaped clamping member having an outer surface;

said second housing having an exterior surface; and said peripheral edge of said substantially U-shaped clamping member being configured for adjoining said edge bordering said opening with said outer surface of said substantially U-shaped clamping member such that said outer surface is disposed flush with said exterior surface of said second housing.

15. The printing device according to claim 14, wherein:

said edge bordering said opening defines a first distance between said edge to the exterior surface of said second housing, said distance plus said thickness of said edge defining the thickness of said housing walls and said side wall portions;

said peripheral edge of said substantially U-shaped clamping member having a thickness, said thickness of said peripheral edge being substantially the same as the first distance;

said first and second legs of said substantially U-shaped clamping member each have an end disposed away from said base portion;

said end comprising at least one of:

a projection; and a recess;

said parts of said housing wall of each of said first and second housing portions overlapped by said first and second legs comprise the other of:

a projection; and a recess;

said projection and said recess comprise said snap-in connection;

at least one of said housing walls of said first and second housing portions comprises, adjacent said snap-in connection, bevel means for reducing the thickness of said at least one housing wall to the thickness of said edge bordering said opening; and said bevel means being configured for permitting a tool to be inserted between said at least one housing wall and an overlapped one of said first and second legs to lift said overlapped one of said first and second legs away from said at least one housing wall to open said snap-in connection.

16. The printing device according to claim 15, wherein:

said at least one wheel comprises a plurality of wheels rotatable about a common axis, each of said plurality of wheels having print type disposed about at least a portion thereof;

said base portion of said substantially U-shaped clamping member defines a window therein for viewing the print-type disposed about the plurality of wheels, the viewed print-type representing the image to be printed;

said base portion comprises reference markings disposed along the window, with at least one reference marking being aligned with and corresponding to each of said plurality of wheels;

each of said plurality of wheels comprises an external toothing;

said means for selectively positioning the print-type comprises shaft means disposed adjacent said plurality of wheels and parallel to said common axis, said shaft means being movable in a direction parallel to said common axis, said shaft means comprises an externally toothed gear for engaging said external toothing of only one of said plurality of wheels;

said shaft means having a portion extending out of said second housing;

said shaft means being rotatable via said extending portion to rotate an engaged one of said plurality of wheels;

said shaft means comprising along said extending portion reference markings corresponding to said reference markings of said base portion, and indicating means for indicating a reference marking of said shaft means for indicating which of said plurality of wheels is engaged by said shaft means;

said print-type comprises a series of print-type disposed one after the other;

said wheels being rotatable to advance the print-type through said printing means;

said printing means comprises means for step-wise advancing of at least one of said plurality of wheels to rotate the at least one of said plurality of wheels an amount sufficient for displacing the print-type by one;

said means for advancing comprises at least one advancing wheel disposed adjacent said at least one of said plurality of wheels advancable by said means for advancing;

said printing means further comprises means for disengaging said means for advancing, said means for disengaging comprising lever means;

said window of said base portion of said substantially U-shaped member comprising a window portion for passage of said lever means therethrough;

said window has a longitudinal dimension disposed across each of said plurality of wheels;

said window portion has a circumferential dimension disposed substantially transverse to the longitudinal dimension of said window;

said lever means being movable from a first position to at least a second position within said window portion, said first position being for engaging said means for advancing with said at least one of said plurality of wheels, and said second position being for disengaging said means for advancing with said one of said wheels;

said window portion comprises catch means for retaining said lever means in each of said first and second positions;

said lever means being elastically prestressed to engage with said catch means;

said base portion adjacent said window portion comprises a marking corresponding to each of said first and second positions to indicate the status of engagement for said means for advancing;

said first portion of said second housing additionally comprises a plurality of guide wheels, said plurality of guide wheels being disposed adjacent one another and rotatable about a common axis;

said common axis of said guide wheels being substantially parallel to said common axis of said plurality of wheels in said second portion of said second housing;

one each of said plurality of guide wheels being aligned with one each of said plurality of wheels;

said print-type comprises belt means disposed about said at least a portion of said plurality of wheels and extending between said aligned ones of said guide wheels and said wheels and disposed about at least a portion of said guide wheels;

said belt means having an inwardly disposed surface disposed towards said wheels and said guide wheels, and an outwardly disposed surface opposite said inwardly disposed surface;

said outwardly disposed surface comprising print-type disposed thereon;

said inwardly disposed surface comprising toothing corresponding to said toothing of said plurality of wheels;

said handle means of said first housing comprises a first handle portion rigidly attached to said first housing and a second handle portion movable towards and away from said first handle portion;

said second handle portion comprises a lever extending from said second handle portion said said printing means;

said marking device comprises a marking device for printing labels;

said marking device further comprises means for supplying labels, the labels being supplied on a peel-away backing material;

said labelling device further comprises a printing surface on which labels are printed by said print-type disposed about said guide wheels;

said marking device further comprises means for feeding labels from said means for supplying to said printing surface;

said means for actuating said printing means comprises said lever portion of said second handle portion to move said printing means towards said printing surface upon movement of said second handle means towards said first handle means and for movement of said printing means away from said printing surface upon movement of said second handle means away from said first handle means; and said labelling device further comprises a dispensing edge for peeling the printed labels from the peel-away backing.

17. A method for assembling a hand-held, portable labelling device for printing a print-type image on a label, said labelling device comprising: a first housing; handle means for gripping said labelling device in a hand; printing means removably disposed within said first housing for printing on a label to produce a printed label, said printing means being movable in a direction towards and away from the label;

means for actuating said printing means to move said printing means towards and away from the label; means for providing ink to said printing means; means for supplying labels; means for feeding labels from said label supply means to said printing means; said printing means comprising: a second housing, said second housing comprising a first housing portion and a second housing portion, said first housing portion and said second housing portion together defining an interior space therebetween; print-type disposed in said interior space of said second housing for printing on the surface; means for selectively positioning the print-type for printing on the surface; and means, being disposed about at least a part of each of said first and second housing portions, for holding together said first and second housing portions at least about said holding means; said holding means comprising: a first portion for releasably engaging said at least a part of said first housing portion; a second portion for releasably engaging said at least a part of said second housing portion; and means for positioning said first and second portions of said holding means with respect to one another for pressing together said first and second housing portions, said method comprising the steps of:

providing said first housing;

providing said handle means on said first housing for gripping said labelling device in a hand;

providing said printing means;

removably disposing at least a portion of said printing means within said first housing;

providing said means for actuating said printing means to move said printing means towards and away from the label;

providing said means for providing ink to said printing means;

providing said means for supplying labels;

providing said means for feeding labels from said label supply means to said printing means;

said providing of said printing means comprising the steps of:

providing said first housing portion and said second housing portion;

providing said print-type within at least one of said first housing portion and said second housing portion;

providing said means for selectively positioning said print-type within said at least one of said first housing portion and said second housing portion;

providing said holding means for being disposed about at least a part of each of said first and second housing portions;

disposing said holding means about said at least a part of each of said first end second housing portions, said disposing comprising:

releasably engaging said first portion of said holding means with said at least a part of said first housing portion;

releasably engaging said second portion of said holding means with said at least a part of said second housing portion; and pressing and maintaining together said first and second housing portions with said means for positioning said first and second portions of said holding means.

18. The method according to claim 17, further comprising:

providing at least one wheel within said second housing, said at least one wheel having a periphery, said at least one wheel defining a plane, and said at least one wheel being rotatable within the plane;

disposing said print-type about at least a semi-circular portion of the periphery of said at least one wheel;

configuring said first housing portion to comprise a housing wall disposed substantially parallel to said plane of said at least one wheel, said housing wall defining a periphery thereabout in the plane of said housing wall;

configuring said second housing portion to comprise a housing wall disposed substantially parallel to said plane of said at least one wheel, said housing wall of said second housing portion defining a periphery thereabout in the plane of said housing wall;

configuring said first and second housing portions to each comprise side wall portions extending from said housing wall thereof and disposed about at least a substantial portion of the periphery of said housing wall, said side wall portions being disposed substantially perpendicular to said housing wall, said side wall portions having a first edge contacting said housing wall and a second edge disposed away from said housing wall;

configuring said holding means to comprise a substantially U-shaped clamping member, said substantially U-shaped clamping member having a base portion with first and second legs extending from said base portion, said base portion comprising said means for positioning, and said first and second legs respectively comprising said first and second portions of said holding means, said base portion of said substantially U-shaped clamping member extends from said housing wall of said first housing portion to said housing wall of said second housing portion; and said disposing of said holding means about said at least a part of each of said first and second housing portions further comprises:

releasably engaging said first leg with said housing wall of said first housing portion, said releasably engaging comprising overlapping said first leg of said substantially U-shaped clamping member with at least a part of said housing wall of said first housing portion;

releasably engaging said second leg with said housing wall of said second housing portion, said releasably engaging comprising overlapping said second leg of said substantially U-shaped clamping member with at least a part of said housing wall of said second housing portion; and disposing said side wall portions of said first and second housing portion immediately adjacent said periphery of said at least one wheel about the semi-circular portion of said periphery.

* * * * *

UNITED STATES PATENT AND TRADEMARK OFFICE

CERTIFICATE OF CORRECTION

PATENT NO. : 5,597,441

DATED : January 28, 1997

INVENTOR(S) : Heinrich VOLK

It is certified that error appears in the above-indentified patent and that said Letters Patent is hereby corrected as shown below:

On the title page, item [56], under the "FOREIGN PATENT DOCUMENTS" section, after the '3143393' reference, delete "3635333" and insert --3635733--.

In column 2, line 13, after 'unit', delete "end" and insert --and--.

In column 5, line 55, after 'wall,', delete "end" and insert --and--.

In column 5, line 57, before 'second', delete "end" and insert --and--.

In column 5, line 62, after 'housing', delete "well" and insert --wall--.

In column 5, line 65, after 'comprising', delete "e" and insert --a--.

In column 6, line 5, after 'portion;', delete "end" and insert --and--.

In column 6, line 40, after 'printing', delete "e" and insert --a--.

In column 6, line 54, after 'defining', delete "en" and insert --an--.

In column 8, line 53, after 'lever' insert --7--.

UNITED STATES PATENT AND TRADEMARK OFFICE

CERTIFICATE OF CORRECTION

PATENT NO. : 5,597,441

DATED : January 28, 1997

INVENTOR(S) : Heinrich VOLK

It is certified that error appears in the above-indentified patent and that said Letters Patent is hereby corrected as shown below:

In column 10, line 18, after '28', delete "end" and insert --and--.

In column 10, line 19, before 'essence,', delete "provided in" and insert --provided. In--.

In column 10, line 33, after the second occurrence of 'the', delete "well" and insert --wall--.

In column 11, line 30, after 'there', delete "dan" and insert --can--.

In column 13, line 19, after 'unit', delete "ls" and insert --is--.

In column 16, line 27, after 'ring', delete " 58' " and insert --50'--.

In column 17, line 58, after ' "O" ', delete "end" and insert --and--.

In column 19, line 32, after 'outside,', delete "end" and insert --and--.

In column 20, line 10, after 'and' delete "No.". (first occurrence)

UNITED STATES PATENT AND TRADEMARK OFFICE

CERTIFICATE OF CORRECTION

PATENT NO. : 5,597,441

DATED : January 28, 1997

INVENTOR(S) : Heinrich VOLK

It is certified that error appears in the above-indentified patent and that said Letters Patent is hereby corrected as shown below:

In column 20, line 45, after 'Heinrich', delete "yolk," and insert --Volk,--.

In column 27, line 65, Claim 13, after 'wheel;', delete "end" and insert --and--.

In column 31, line 52, Claim 17, after 'first', delete "end" and insert --and--.

Signed and Sealed this

Thirteenth Day of May, 1997

*Attest:*

BRUCE LEHMAN

*Attesting Officer* *Commissioner of Patents and Trademarks*